United States Patent
Lee et al.

(10) Patent No.: US 11,864,236 B2
(45) Date of Patent: Jan. 2, 2024

(54) METHOD AND APPARATUS FOR PERFORMING RACH PROCEDURE BY UE IN WIRELESS COMMUNICATION SYSTEM

(71) Applicant: LG Electronics Inc., Seoul (KR)

(72) Inventors: Jeongsu Lee, Seoul (KR); Hyunsoo Ko, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 212 days.

(21) Appl. No.: 16/993,563

(22) Filed: Aug. 14, 2020

(65) Prior Publication Data

US 2021/0051733 A1    Feb. 18, 2021

(30) Foreign Application Priority Data

Aug. 16, 2019 (KR) .................. 10-2019-0100572

(51) Int. Cl.
| | |
|---|---|
| *H04W 74/08* | (2009.01) |
| *H04L 5/00* | (2006.01) |
| *H04B 7/06* | (2006.01) |
| *H04W 24/10* | (2009.01) |
| *H04W 72/21* | (2023.01) |

(52) U.S. Cl.
CPC ...... *H04W 74/0833* (2013.01); *H04B 7/0626* (2013.01); *H04L 5/0048* (2013.01); *H04W 24/10* (2013.01); *H04W 72/21* (2023.01)

(58) Field of Classification Search
CPC ............. H04W 74/0833; H04W 24/10; H04W 72/0413; H04B 7/0626; H04B 7/0619; H04B 7/0695; H04L 5/0048
See application file for complete search history.

(56) References Cited

U.S. PATENT DOCUMENTS

2021/0051731 A1* 2/2021 Lee .................. H04W 52/50
2021/0168862 A1* 6/2021 Murray ............ H04W 74/0816

FOREIGN PATENT DOCUMENTS

KR   20160122221   10/2016
WO   WO-2021026118 A1 *   2/2021   ........ H04W 74/0833

OTHER PUBLICATIONS

CMCC, "2-step RACH power control," R2-1909770, 3GPP TSG-RAN WG2 #107, Prague, Czech Republic, Aug. 26-30, 2019, 7 pages.
Intel Corporation, "Discussion on channel structure for 2-step RACH," R1-19606779, 3GPP TSG, RAN WG1 #97, Reno, USA, May 13-17, 2019, 11 pages.
Panasonic, "Discussion on 2-step RACH procedure," R1-1906864, 3GPP TSG RAN WG1 #97, Reno, USA, May 13-17, 2019, 9 pages.
(Continued)

*Primary Examiner* — Justin T Van Roie
(74) *Attorney, Agent, or Firm* — Fish & Richardson P.C.

(57) ABSTRACT

A method of performing a random access channel (RACH) procedure by a user equipment (UE) in a wireless communication system is disclosed. The method includes transmitting a physical random access channel (PRACH) and a physical uplink shared channel (PUSCH) via a message A, and receiving a message B related to contention resolution in response to the message A. An index related to a reference signal used for transmission power allocation to the PUSCH is same as an index of a resource used for channel measurement for transmission of the PRACH, based on that the PRACH and the PUSCH are transmitted via the message A.

9 Claims, 30 Drawing Sheets

(56) References Cited

OTHER PUBLICATIONS

PCT International Search Report in International Appln. No., PCT/KR2020/009980, dated Nov. 23, 2020, 9 pages.
Samsung, "Procedure for Two-step RACH," R1-1906906, 3GPP TSG RAN WG1 #97, Reno, USA, May 13-17, 2019, 9 pages.
Intel Corporation, "Discussion on channel structure for 2-step RACH," R1-1906779, 3GPP TSG RAN WG1 #97, Reno, USA, dated May 13-17, 2019, 11 pages.

* cited by examiner

CONTROL-PLANE PROTOCOL STACK

USER-PLANE PROTOCOL STACK

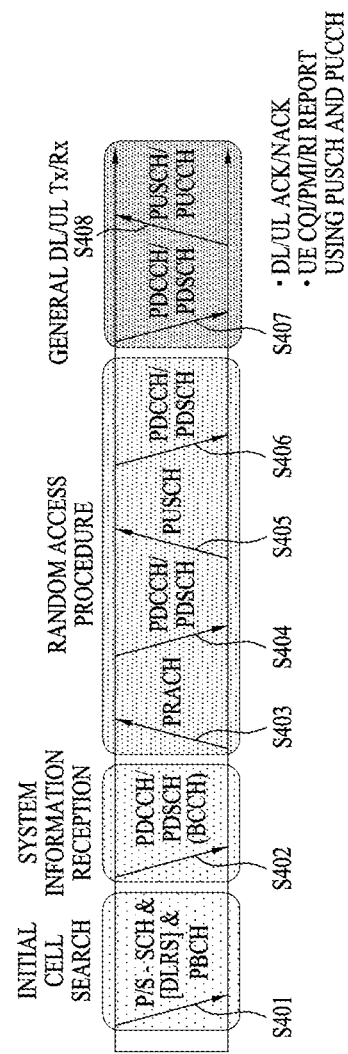

METHOD AND APPARATUS FOR PERFORMING RACH PROCEDURE BY UE IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 10-2019-0100572, filed on Aug. 16, 2019, the contents of which are hereby incorporated by reference herein in their entirety.

BACKGROUND

Field

The present disclosure relates to a method and apparatus for performing a random access channel (RACH) procedure by a user equipment (UE) in a wireless communication system, and more particularly, to a method and apparatus for setting the transmission power of a signal for performing a 2-step RACH procedure by a UE in a wireless communication system.

Discussion of the Related Art

As more and more communication devices require larger communication capacities, the need for enhanced mobile broadband communication has emerged. Massive machine type communication (MTC) providing various services to inter-connected multiple devices and things at any time in any place is one of significant issues to be addressed for next-generation communication. A communication system design in which services sensitive to reliability and latency are considered is under discussion as well. As such, the introduction of the next-generation radio access technology (RAT) for enhanced mobile broadband communication (eMBB), massive MTC (mMTC), and ultra-reliable and low latency communication (URLLC) is being discussed. For convenience, this technology is called NewRAT (or NR) in the present disclosure.

SUMMARY

Provided are a method and apparatus for setting the transmission power of a signal for performing a 2-step random access channel (RACH) procedure.

Additional aspects will be set forth in part in the description which follows and, in part, will be apparent from the description, or may be learned by practice of the presented embodiments of the present disclosure.

According to an embodiment of the present disclosure, a method of performing an RACH procedure by a user equipment (UE) in a wireless communication system includes transmitting, to a base station (BS), a physical random access channel (PRACH) and a physical uplink shared channel (PUSCH) via a message A, and receiving, from the BS, a message B related to contention resolution in response to the message A. An index related to a reference signal used for transmission power allocation to the PUSCH is same as an index of a resource used for channel measurement for transmission of the PRACH, based on that the PRACH and the PUSCH are transmitted via the message A.

The index related to the reference signal may be used for calculating a path loss for the transmission power allocation.

Further, a transmission beam for transmission of the PUSCH may be selected based on the calculated path loss.

The method may further include receiving, from the BS, a synchronization signal block (SSB) or a channel state information-reference signal (CSI-RS), related to channel measurement for transmission of the PUSCH.

Further, the channel measurement for the transmission of the PUSCH may be performed based on reference signal received power (RSRP) of the SSB or the CSI-RS.

Further, the index related to the reference signal may be an index of the SSB related to the channel measurement for the transmission of the PUSCH.

Further, the PRACH transmitted via the message A and the PUSCH transmitted via the message A are transmitted based on a predetermined time gap in a time domain.

According to another embodiment of the present disclosure, an apparatus for performing an RACH procedure in a wireless communication system includes at least one processor, and at least one memory operatively connected to the at least one processor and storing instructions which, when executed, cause the at least one processor to perform a specific operation. The specific operation includes transmitting a PRACH and a PUSCH via a message A, and receiving a message B related to contention resolution in response to the message A. An index related to a reference signal used for transmission power allocation to the PUSCH is same as an index of a resource used for channel measurement for transmission of the PRACH, based on that the PRACH and the PUSCH are transmitted via the message A.

The index related to the reference signal may be used for calculating a path loss for the transmission power allocation.

Further, a transmission beam for transmission of the PUSCH may be selected based on the calculated path loss.

The specific operation may further include receiving an SSB or a CSI-RS, related to channel measurement for transmission of the PUSCH.

Further, the channel measurement for the transmission of the PUSCH may be performed based on RSRP of the SSB or the CSI-RS.

Further, the index related to the reference signal may be an index of the SSB related to the channel measurement for the transmission of the PUSCH.

Further, the PRACH transmitted via the message A and the PUSCH transmitted via the message A are transmitted based on a predetermined time gap in a time domain.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings:

FIG. 4 is a diagram illustrating physical channels and a general signal transmission method using the physical channels in a 3GPP system;

DETAILED DESCRIPTION

Figure 1:
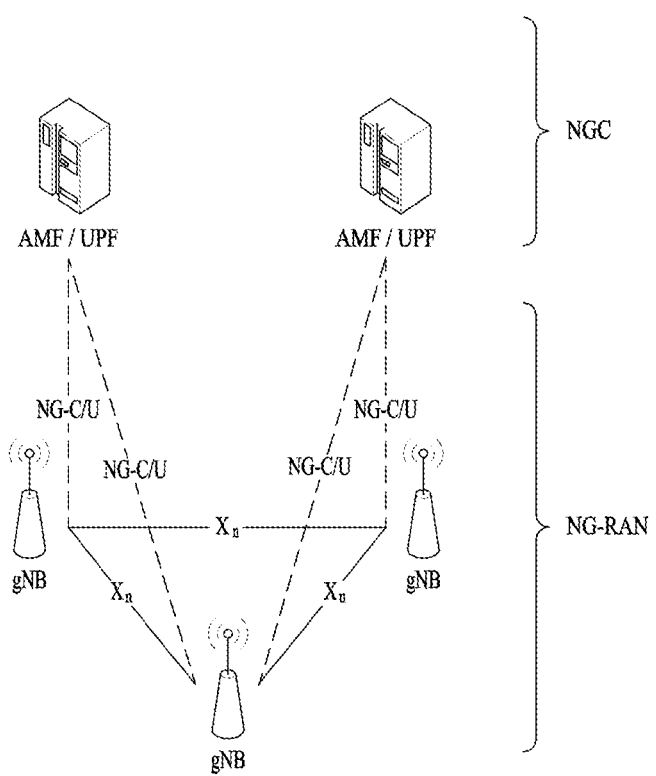
FIG. 1 is a diagram illustrating an exemplary network architecture of a new radio access technology (NewRAT or NR) system.

The configuration, operation, and other features of the present disclosure will be easily understood from embodiments of the present disclosure, examples of which are illustrated in the accompanying drawings. The following embodiments are examples in which the technical features of the present disclosure are applied to a $3^{rd}$ generation partnership project (3GPP) system.

While embodiments of the present disclosure are described in the context of long term evolution (LTE), long term evolution-advanced (LTE-A), and new radio access technology (NewRAT or NR) systems, they are merely examples. The embodiments of the present disclosure are applicable to any communication system corresponding to the above definition.

Further, the term used herein "base station (BS)" encompasses "remote radio head (RRH)", "evolved node B (eNode B or eNB)", "transmission point (TP)", "reception point (RP)", "relay", and so on.

The 3GPP communication standards define downlink (DL) physical channels corresponding to resource elements (REs) carrying information originated from a higher layer and DL physical signals corresponding to REs which are used in the physical (PHY) layer but do not carry information originated from a higher layer. For example, the DL physical channels include physical downlink shared channel (PDSCH), physical broadcast channel (PBCH), physical multicast channel (PMCH), physical control format indicator channel (PCFICH), physical downlink control channel (PDCCH), and physical hybrid automatic repeat request indicator channel (PHICH). The DL physical signals include, for example, reference signal (RS) and synchronization signal (SS). The RS is also called pilot, which is a signal of a predefined special waveform known to both a next-generation node B (gNB) and a user equipment (UE). For example, RSs include cell-specific RS, UE-specific RS (UE-RS), positioning RS (PRS), and channel state information (CSI) RS (CSI-RS). The 3GPP LTE/LTE-A standards define uplink (UL) physical channels corresponding to REs carrying information originated from a higher layer, and UL physical signals corresponding to REs which are used in the PHY layer but do not carry information originated from a higher layer. For example, the UL physical channels include physical uplink shared channel (PUSCH), physical uplink control channel (PUCCH), and physical random access channel (PRACH). The UL physical signals include demodulation reference signal (DMRS) for UL control and data signals, and sounding reference signal (SRS) used for UL channel measurement.

In the present disclosure, the PDCCH, PCFICH, PHICH, and PDSCH refer to sets of time-frequency resources or REs that carry downlink control information (DCI), a control format indicator (CFI), a DL acknowledgment/negative acknowledgment (ACK/NACK), and DL data, respectively. Further, the PUCCH, PUSCH, and PRACH refer to sets of time-frequency resources or REs that carry uplink control information (UCI), UL data, and a random access signal, respectively. In the present disclosure, particularly time-frequency resources or REs allocated to or belonging to the PDCCH, PCFICH, PHICH, PDSCH, PUCCH, PUSCH, and PRACH are referred to as PDCCH, PCFICH, PHICH, PDSCH, PUCCH, PUSCH, and PRACH resources or REs, respectively. When it is said that a UE transmits the PUCCH, PUSCH, or PRACH, this implies that the UE transmits UCI, UL data, or a random access signal on or through the PUSCH, PUCCH, or PRACH. Further, when it is said that the gNB transmits the PDCCH, PCFICH, PHICH, or PDSCH, this implies that the gNB transmits DL data or DCI on or through the PDCCH, PCFICH, PHICH, or PDSCH.

OFDM symbols, carriers, subcarriers, and REs allocated to or configured with the CRS, DMRS, CSI-RS, SRS, and UE-RS are referred to CRS, DMRS, CSI-RS, SRS, and UE-RS symbols, carriers, subcarriers, and REs, respectively. For example, an OFDM symbol allocated to or configured with a tracking reference signal (TRS) is referred to as a TRS symbol, a subcarrier allocated to or configured with the TRS is referred to as a TRS subcarrier, and an RE allocated to or configured with the TRS is referred to as a TRS RE. Further, a subframe configured for TRS transmission is referred to as a TRS subframe. A subframe carrying a broadcast signal is referred to as a broadcast subframe or a PBCH subframe, and a subframe carrying an SS (e.g., a primary synchronization signal (PSS) and/or a secondary synchronization signal (SSS)) is referred to as an SS subframe or a PSS/SSS subframe. An OFDM symbol, subcarrier, and RE allocated to or configured with the PSS/SSS are referred to as a PSS/SSS symbol, subcarrier, and RE, respectively.

In the present disclosure, a CRS port, a UE-RS port, a CSI-RS port, and a TRS port is an antenna port configured for CRS transmission, an antenna port configured for UE-RS transmission, an antenna port configured for CSI-RS transmission, and an antenna port configured for TRS transmission, respectively. Antenna ports configured for transmission of CRSs may be distinguished from each other by the positions of REs occupied by the CRSs according to CRS ports. Antenna ports configured for transmission of UE-RSs may be distinguished from each other by the positions of REs occupied by the UE-RSs according to UE-RS ports. Antenna ports configured for transmission of CSI-RSs may be distinguished from each other by the positions of REs occupied by the CSI-RSs according to CSI-RS ports. Accordingly, the terms CRS port, UE-RS port, CSI-RS port, and TRS port are used in the meaning of patterns of REs occupied by the CRS, UE-RS, the CSI-RS, and the TRS, respectively.

FIG. 1 is a diagram illustrating an exemplary network architecture of an NR system.

The network of the NR system largely includes a next-generation radio access network (NG-RAN) and a next-generation core (NGC). The NGC is also called a $5^{th}$ generation core (5GC).

Referring to FIG. 1, the NG-RAN includes gNBs providing termination of user-plane protocols (e.g., service data adaptation protocol (SDAP), packet data convergence protocol (PDCP), radio link control (RLC), medium access control (MAC), and physical (PHY)) and control-plane protocols (e.g., RRC, PDCP, RLC, MAC, and PHY) towards UEs. The gNBs are interconnected via Xn interfaces. The gNBs are connected to the NGC through NG interfaces. For example, a gNB is connected to a core network node having an access and mobility management function (AMF) through an N2 interface, which is one of interfaces between the gNB and the NGC and to a core network node having a user plane function (UPF) through an N3 interface, which is another interface between the gNB and the NGC. The AMF and the UPF may be implemented by different core network devices or by one core network device. In the RAN, signal transmission/reception between a BS and a UE is performed through a radio interface. For example, signal transmission/reception between the BS and the UE in the RAN is performed in physical resources (e.g., a radio frequency (RF)). In contrast, signal transmission/reception between the gNB and the network functions (e.g., AMF and UPF) in the core network may be performed via physical connections (e.g., optical cables) between the core network nodes or via logical connections between the core network functions, rather than via radio interfaces.

Figure 2:
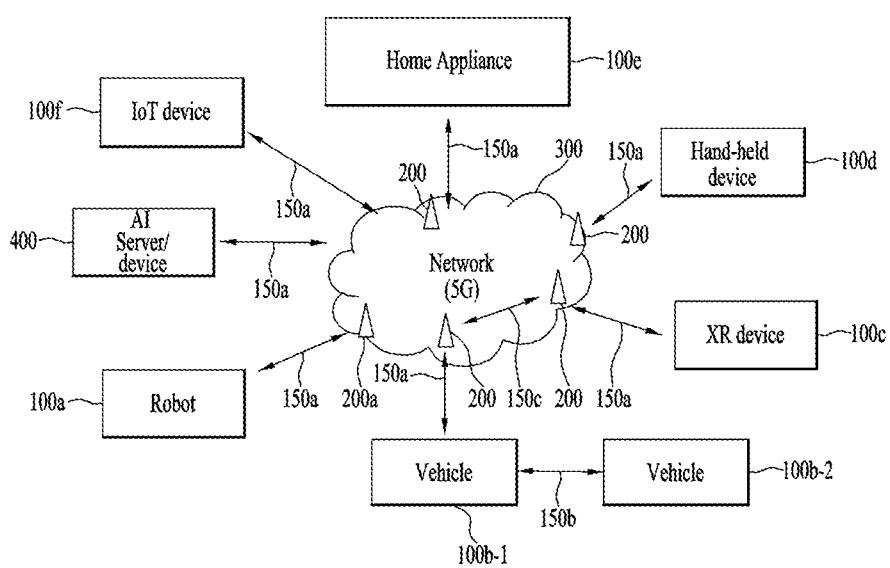
FIG. 2 is a diagram illustrating an exemplary wireless communication environment to which embodiments of the present disclosure are applicable.

FIG. 2 illustrates a communication system 1 applied to the present disclosure.

Referring to FIG. 2, the communication system 1 applied to the present disclosure includes wireless devices, BSs, and a network. The wireless devices are devices performing communication using RAT (e.g., 5G NR or LTE) and may be referred to as communication/radio/5G devices. The wireless devices may include, but not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television, a smartphone, a computer, a wearable, a home appliance, a digital signage, a vehicle, a robot, and so on. The hand-held device may include a smartphone, a smart pad, a wearable device (e.g., a smart watch or a smart glasses), and a computer (e.g., a laptop). The home appliance may include a television, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200 or the network 300, the wireless devices 100a to 100f may perform direct communication (e.g., sidelink communication) with each other without intervention of the BSs or the network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between BSs 200. The wireless communication/connections may be established through various RATs (e.g., 5G NR) such as UL/DL communication 150a, sidelink communication 150b (or, D2D communication), or inter-BS communication 150c (e.g. relay and integrated access backhaul (IAB)). Radio signals may be transmitted and received between the wireless devices, between the wireless devices and the BSs, and between the BSs through the wireless communication/connections 150a, 150b, and 150c. For example, signals may be transmitted and received on various physical signals through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals may be performed based on the various proposals of the present disclosure.

Now, a description will be given below of 5G communication in the NR system.

Three key requirement areas of 5G include (1) enhanced mobile broadband (eMBB), (2) massive machine type communication (mMTC), and (3) ultra-reliable and low-latency communication (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity; provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in 5G systems including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

Figure 3A:
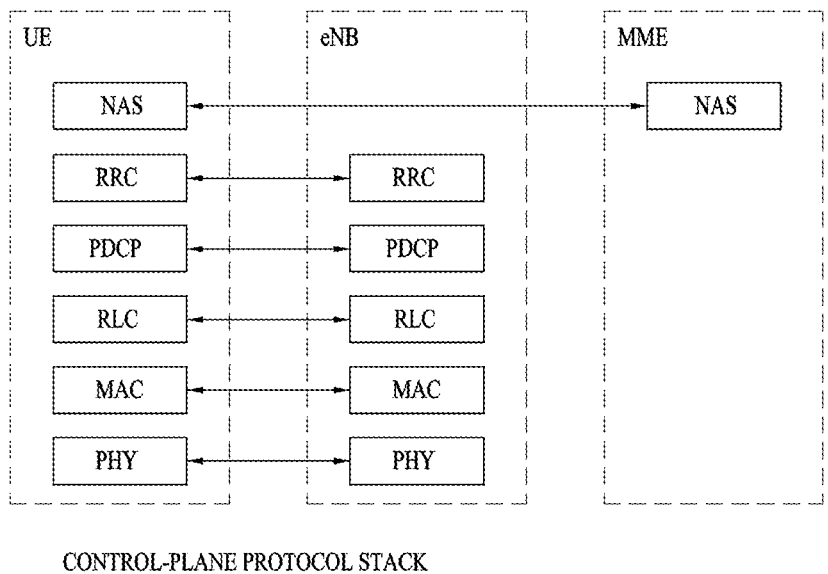
FIGS. 3A and 3B are diagrams illustrating a control-plane protocol stack and a user-plane protocol stack in a radio interface protocol architecture conforming to a 3rd generation partnership project (3GPP) radio access network standard between a user equipment (UE) and an evolved UMTS terrestrial radio access network (E-UTRAN)
Figure 3B:
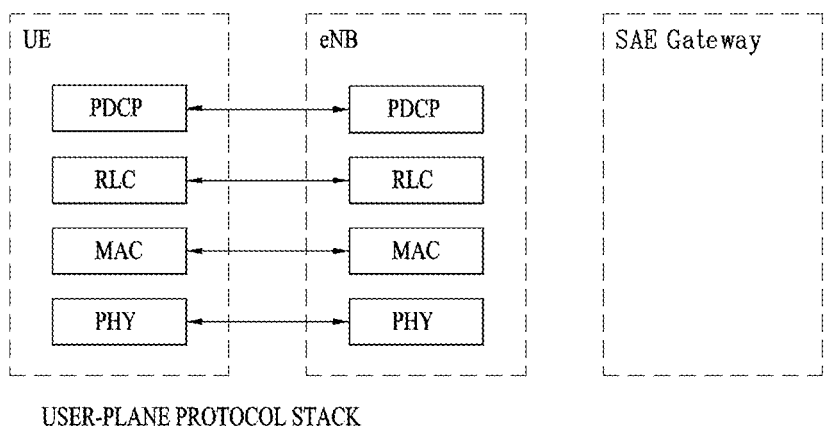

FIGS. 3A and 3B illustrate control-plane and user-plane protocol stacks in a radio interface protocol architecture conforming to a 3GPP wireless access network standard between a UE and an evolved UMTS terrestrial radio access network (E-UTRAN). The control plane is a path in which the UE and the network transmit control messages to manage calls, and the user plane is a path in which data generated from an application layer, for example, voice data or Internet packet data is transmitted.

A PHY layer at Layer 1 (L1) provides information transfer service to its higher layer, medium access control (MAC). The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for DL and in single carrier frequency division multiple access (SC-FDMA) for UL.

The MAC layer at Layer 2 (L2) provides service to its higher layer, a radio link control (RLC) layer via logical channels. The RLC layer at L2 supports reliable data transmission. RLC functionality may be implemented in a function block of the MAC layer. a packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A non-access stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a common control channel (CCCH), a multicast control channel (MCCH), a multicast traffic channel (MTCH), and so on.

FIG. 4 illustrates physical channels and a general method for transmitting signals on the physical channels in the 3GPP system.

Referring to FIG. 4, when a UE is powered on or enters a new cell, the UE performs initial cell search (S401). The initial cell search involves acquisition of synchronization with a BS. Specifically, the UE synchronizes its timing to the BS and acquires a cell identifier (ID) and other information by receiving a PSS and an SSS from the BS. Then the UE may acquire information broadcast in the cell by receiving a PBCH from the BS. During the initial cell search, the UE may monitor a DL channel state by receiving a DL RS.

After the initial cell search, the UE may acquire detailed system information by receiving a PDCCH and receiving a PDSCH based on information included in the PDCCH (S402).

If the UE initially accesses the BS or has no radio resources for signal transmission to the BS, the UE may perform a ransom access (or RACH) procedure with the BS (S403 to S406). In the RACH procedure, the UE may transmit a predetermined sequence as a preamble on a PRACH (S403 and S405) and may receive a random access response (RAR) message to the preamble on a PDCCH and a PDSCH associated with the PDCCH. In the case of a contention-based RACH, the UE may additionally perform a contention resolution procedure (S406).

After the above procedure, the UE may receive a PDCCH and/or a PDSCH from the BS (S407) and transmit a PUSCH and/or a PUCCH to the BS (S408), which is a general DL and UL signal transmission procedure. Particularly, the UE may receive DCI on a PDCCH. Herein, the DCI includes control information such as resource allocation information for the UE. Different DCI formats may be defined according to different usages of DCI.

Control information that the UE transmits to the BS on the UL or receives from the BS on the DL includes a DL/UL ACK/NACK signal, a channel quality indicator (CQI), a precoding matrix index (PMI), a rank indicator (RI), and so on. The UE may transmit control information such as a CQI, a PMI, an RI, and so on a PUSCH and/or a PUCCH.

Use of an ultra-high frequency band, that is, a millimeter wave frequency band at or above 6 GHz for data transmission in a wide frequency band at higher transmission rates for multiple users is under consideration in the NR system. In 3GPP, this system is called NR. Therefore, this system will be referred to as the NR system in the present disclosure.

In NR, various numerologies or subcarrier spacings (SCSs) may be supported to support various 5G services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 may be a sub 6 GHz range, and FR2 may be an above 6 GHz range called millimeter wave (mmW).

Table 1 below defines the NR frequency bands.

TABLE 1

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

Discontinuous Reception (DRX) Operation

While the UE performs the above-described/proposed procedures and/or methods, the UE may perform the DRX operation. The UE for which DRX is configured may reduce power consumption by discontinuously receiving a DL signal. DRX may be performed in a radio resource control (RRC)_IDLE state, an RRC_INACTIVE state, or an RRC_CONNECTED state. DRX in the RRC_IDLE state and the RRC_INACTIVE state is used to discontinuously receive a paging signal. Hereinafter, DRX performed in the RRC_CONNECTED state will be described (RRC_CONNECTED DRX).

Figure 5:
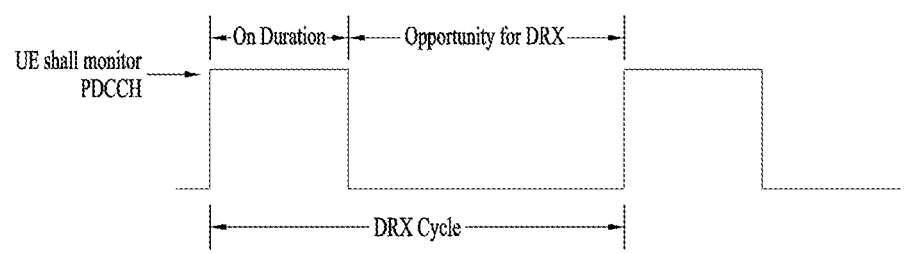
FIG. 5 is a diagram illustrating an embodiment of a discontinuous reception (DRX) operation.

FIG. 5 illustrates a DRX cycle (RRC_CONNECTED state).

Referring to FIG. 5, the DRX cycle includes an On-duration and an opportunity for DRX. The DRX cycle defines a time interval at which the On-duration is cyclically repeated. The On-Duration indicates a time duration that the UE monitors to receive a PDCCH. If DRX is configured, the UE performs PDCCH monitoring during the On-duration. If the PDCCH is successfully detected during PDCCH monitoring, the UE operates an inactivity timer and maintains an awoken state. On the other hand, if there is no PDCCH which has been successfully detected during PDCCH monitoring, the UE enters a sleep state after the On-duration is ended. Therefore, when DRX is configured, the UE may discontinuously perform PDCCH monitoring/reception in the time domain upon performing the above-described/proposed procedures and/or methods. For example, when DRX is configured, a PDCCH reception occasion (e.g., a slot having a PDCCH search space) in the present disclosure may be discontinuously configured according to DRX configuration. When DRX is not configured, PDCCH monitoring/reception may be continuously performed in the time domain. For example, when DRX is not configured, the PDCCH reception occasion (e.g., the slot having the PDCCH search space) in the present disclosure may be continuously configured. Meanwhile, PDCCH monitoring may be restricted in a time duration configured as a measurement gap regardless of whether DRX is configured or not.

Table 2 illustrates a UE procedure related to DRX (RRC_CONNECTED state). Referring to Table 2, DRX configuration information is received through higher-layer (e.g., RRC) signaling. Whether DRX is ON or OFF is controlled by a DRX command of the MAC layer. If DRX is configured, the UE may discontinuously perform PDCCH monitoring in the above-described/proposed procedures and/or methods in the present disclosure, as illustrated in FIG. 5.

TABLE 2

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

Herein, MAC-CellGroupConfig includes configuration information needed to configure a MAC parameter for a cell group. MAC-CellGroupConfig may also include configuration information regarding DRX. For example, MAC-CellGroupConfig may include information for defining DRX as follows.

Value of drx-OnDurationTimer: defines the length of the starting duration of a DRX cycle.
Value of drx-InactivityTimer: defines the length of the starting duration in which the UE is in an awoken state, after a PDCCH occasion in which a PDCCH indicating initial UL or DL data is detected.
Value of drx-HARQ-RTT-TimerDL: defines the length of a maximum time duration until a DL retransmission is received, after an DL initial transmission is received.
Value of drx-HARQ-RTT-TimerDL: defines the length of a maximum time duration until a grant for UL retransmission is received, after a grant for UL initial transmission is received.
drx-LongCycleStartOffset: defines the time length and starting time of a DRX cycle
drx-ShortCycle (optional): defines the time length of a short DRX cycle.

Herein, if any one of drx-OnDurationTimer, drx-InactivityTimer, drx-HARQ-RTT-TimerDL, and drx-HARQ-RTT-TimerDL is running, the UE performs PDCCH monitoring in every PDCCH occasion while maintaining the awoken state.

Multiplexing of Short PUCCH and Long PUCCH

Figure 6:
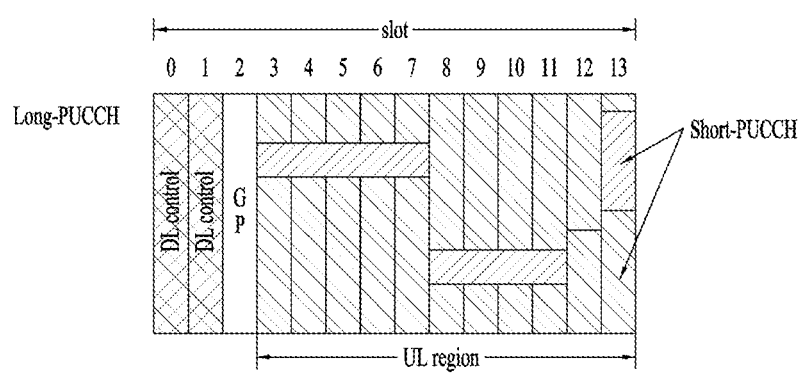
FIG. 6 is a diagram illustrating multiplexing of a long physical uplink control channel (PUCCH) and a short PUCCH in the NR system.

FIG. 6 illustrates exemplary multiplexing between a UL signal and short and long PUCCHs.

A PUCCH (e.g., PUCCH format 0/2) and a PUSCH may be multiplexed in time division multiplexing (TDM) or frequency division multiplexing (FDM). A short PUCCH and a long PUCCH from different UEs may be multiplexed in TDM or FDM. Short PUCCHs from a single UE may be multiplexed in TDM within one slot. A short PUCCH and a long PUCCH from a single UE may be multiplexed in TDM or FDM within one slot.

ACK/NACK Transmission

Figure 7:
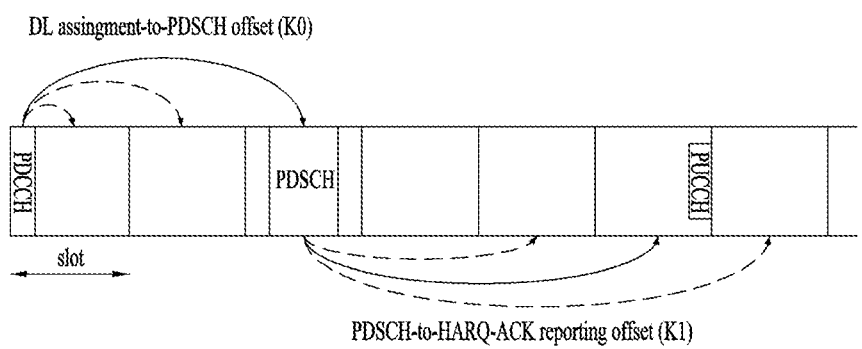
FIG. 7 is a diagram illustrating an exemplary acknowledgment/negative acknowledgment (ACK/NACK) transmission process.

FIG. 7 illustrates an ACK/NACK transmission procedure. Referring to FIG. 7, the UE may detect a PDCCH in slot #n. Here, the PDCCH includes DL scheduling information (e.g., DCI format 1_0 or 1_1). The PDCCH indicates a DL assignment-to-PDSCH offset (K0) and a PDSCH-HARQ-ACK reporting offset (K1). For example, DCI format 1_0 or 1_1 may include the following information.

Frequency domain resource assignment (FDRA): indicates an RB set assigned to the PDSCH.
Time domain resource assignment (TDRA): indicates K0 and the starting position (e.g. OFDM symbol index) and duration (e.g. the number of OFDM symbols) of the PDSCH in a slot. TDRA may be indicated by a start and length indicator value (SLIV).
PDSCH-to-HARQ_feedback timing indicator: indicates K1.

After receiving the PDSCH in slot #(n+K0) according to the scheduling information of slot #n, the UE may transmit UCI on the PUCCH in slot #(n+K1). The UCI includes an HARQ-ACK response to the PDSCH. In the case where the PDSCH is configured to transmit a maximum of one TB, the HARQ-ACK response may be configured in one bit. In the case where the PDSCH is configured to transmit a maximum of two TBs, the HARQ-ACK response may be configured in two bits if spatial bundling is not configured and may be configured in one bit if spatial bundling is configured. When slot #(n+K1) is designated as an HARQ-ACK transmission time for a plurality of PDSCHs, the UCI transmitted in slot #(n+K1) includes HARQ-ACK responses to the plurality of PDSCHs.

Figure 8:
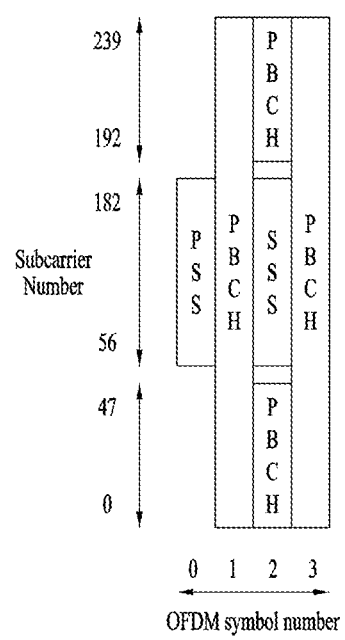
FIGS. 8 to 13 are diagrams illustrating the composition of a synchronization signal/physical broadcast channel (SS/PBCH) block and a method of transmitting an SS/PBCH block.

FIG. 8 is a diagram illustrating a synchronization signal block (SSB) structure. A UE may perform cell search, system information acquisition, beam alignment for initial access, DL measurement, and so on based on an SSB. The term SSB is interchangeably used with SS/PBCH block.

Referring to FIG. 8, an SSB includes a PSS, an SSS, and a PBCH. The SSB includes four consecutive OFDM symbols, which carry the PSS, PBCH, SSS/PBCH, and PBCH, respectively. Each of the PSS and the SSS includes one OFDM symbol by 127 subcarriers, and the PBCH includes three OFDM symbols by 576 subcarriers. Polar coding and quadrature phase shift keying (QPSK) are applied to the PBCH. The PBCH includes data REs and DMRS REs in each OFDM symbol. There are three DMRS REs per RB, with three data REs between every two adjacent DMRS REs.

Cell Search

Cell search is a process of acquiring time/frequency synchronization with a cell and detecting the cell ID (e.g., physical layer cell ID (PCID)) of the cell at a UE. The PSS is used to detect a cell ID in a cell ID group, and the SSS is used to detect the cell ID group. The PBCH is used to detect an SSB (time) index and a half-frame.

The cell search procedure of the UE may be summarized in Table 3 below.

TABLE 3

| | Type of Signals | Operations |
|---|---|---|
| $1^{st}$ step | PSS | SS/PBCH block (SSB) symbol timing acquisition<br>Cell ID detection within a cell ID group (3 hypothesis) |
| $2^{nd}$ Step | SSS | Cell ID group detection (336 hypothesis) |
| $3^{rd}$ Step | PBCH DMRS | SSB index and Half frame (HF) index (Slot and frame boundary detection) |
| $4^{th}$ Step | PBCH | Time information (80 ms, System Frame Number (SFN), SSB index, HF)<br>Remaining Minimum System Information (RMSI)<br>Control resource set (CORESET)/ Search space configuration |
| $5^{th}$ Step | PDCCH and PDSCH | Cell access information<br>RACH configuration |

Figure 9:
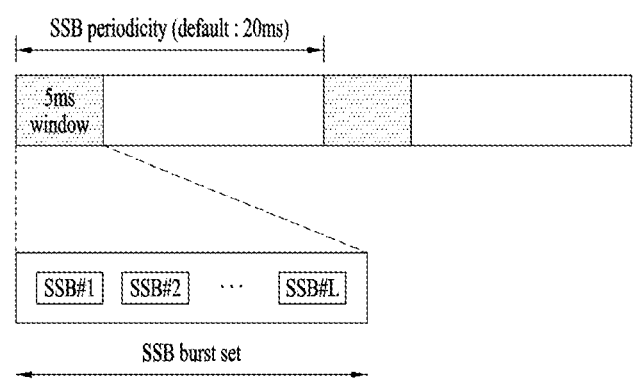

FIG. 9 illustrates exemplary SSB transmission.

Referring to FIG. 9, an SSB is transmitted periodically according to an SSB periodicity. A default SSB periodicity that the UE assumes during initial cell search is defined as 20 ms. After cell access, the SSB periodicity may be set to one of {5 ms, 10 ms, 20 ms, 40 ms, 80 ms, 160 ms} by a network (e.g., a BS). An SSB burst set is configured at the start of an SSB period. The SSB burst set includes a 5-ms time window (i.e., a half-frame), and an SSB may be transmitted up to L times in the SSB burst set. The maximum allowed transmission number L of an SSB may be given as follows according to the frequency band of a carrier. One slot includes up to two SSBs.

For frequency range of up to 3 GHz, L=4
For frequency range from 3 GHz to 6 GHz, L=8
For frequency range from 6 GHz to 52.6 GHz, L=64

The time positions of SSB candidates in an SS burst set may be defined as follows according to SCSs. The time positions of SSB candidates are indexed with (SSB indexes) 0 to L-1 in time order in the SSB burst set (i.e., half-frame).

Case A—15-kHz SCS: The indexes of the first symbols of candidate SSBs are given as {2, 8}+14*n where n=0, 1 for a carrier frequency equal to or lower than 3 GHz, and n=0, 1, 2, 3 for a carrier frequency of 3 GHz to 6 GHz.

Case B—30-kHz SCS: The indexes of the first symbols of candidate SSBs are given as {4, 8, 16, 20}+28*n where n=0 for the carrier frequency equal to or lower than 3 GHz, and n=0, 1 for the carrier frequency of 3 GHz to 6 GHz.

Case C—30-kHz SCS: The indexes of the first symbols of candidate SSBs are given as {2, 8}+14*n where n=0, 1 for the carrier frequency equal to or lower than 3 GHz, and n=0, 1, 2, 3 for the carrier frequency of 3 GHz to 6 GHz.

Case D—120-kHz SCS: The indexes of the first symbols of candidate SSBs are given as {4, 8, 16, 20}+28*n where n=0, 1, 2, 3, 5, 6, 7, 8, 10, 11, 12, 13, 15, 16, 17, 18 for a carrier frequency above 6 GHz.

Case E—240-kHz SCS: The indexes of the first symbols of candidate SSBs are given as {8, 12, 16, 20, 32, 36, 40, 44}+56*n where n=0, 1, 2, 3, 5, 6, 7, 8 for the carrier frequency above 6 GHz.

Figure 10:
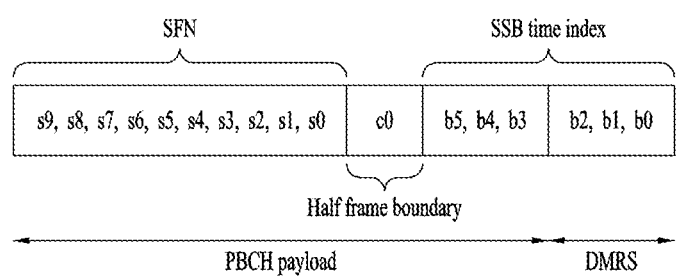

FIG. 10 illustrates acquisition of DL time synchronization information at a UE.

The UE may acquire DL synchronization by detecting an SSB. The UE may identify the structure of an SSB burst set based on the index of the detected SSB and thus detect a symbol, slot, or half-frame boundary. The number of a frame or half-frame to which the detected SSB belongs to may be identified by SFN information and half-frame indication information.

Specifically, the UE may acquire 10-bit SFN system information s0 to s9 from the PBCH. 6 bits out of the 10-bit SFN information is obtained from a master information block (MIB), and the remaining 4 bits are obtained from a PBCH TB.

The UE may then acquire 1-bit half-frame indication information c0. When a carrier frequency is 3 GHz or below, the half-frame indication information may be signaled implicitly by a PBCH DMRS. The PBCH DMRS uses one of 8 PBCH DMRS sequences to indicate 3-bit information. Therefore, when L=4, the remaining one bit except for bits indicating an SSB index among 3 bits that may be indicated by the 8 PBCH DMRS sequences may be used as a half-frame indication.

Finally, the UE may acquire an SSB index based on the DMRS sequence and PBCH payload. SSB candidates are indexed with 0 to L−1 in time order in an SSB burst set (i.e., half-frame). When L=8 or L=64, three least significant bits (LSBs) b0, b1 and b2 of an SSB index may be indicated by 8 different PBCH DMRS sequences. When L=64, three most significant bits (MSBs) b3, b4 and b5 of the SSB index are indicated by the PBCH. When L=2, two LSBs b0 and b1 of the SSB index may be indicated by 4 different PBCH DMRS sequences. When L=4, the remaining one bit b2 except for the bits indicating the SSB index among the three bits may be used as a half-frame indication.

System Information Acquisition

Figure 11:
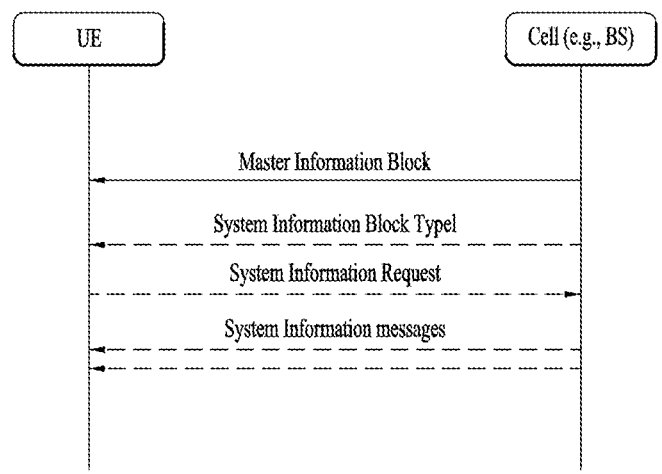

FIG. 11 illustrates a system information (SI) acquisition procedure. The UE may acquire access stratum (AS)-/non-access stratum (NAS)-information in the SI acquisition procedure. The SI acquisition procedure may be applied to UEs in RRC_IDLE, RRC_INACTIVE, and RRC_CONNECTED states.

SI is divided into a master information block (MIB) and a plurality of system information blocks (SIBs). The MIB and the plurality of SIBs are further divided into minimum SI and other SI. The minimum SI may include the MIB and systemInformationBlock1 (SIB1), carrying basic information required for initial access and information required to acquire the other SI. SIB1 may also be referred to as remaining minimum system information (RMSI). For details, the following may be referred to.

The MIB includes information/parameters related to reception of SIB1 and is transmitted on the PBCH of an SSB. The UE assumes that a half-frame including an SSB is repeated every 20 ms during initial cell selection. The UE may determine from the MIB whether there is any control resource set (CORESET) for a Type0-PDCCH common search space. The Type0-PDCCH common search space is a kind of PDCCH search space and used to transmit a PDCCH that schedules an SI message. In the presence of a Type0-PDCCH common search space, the UE may determine (1) a plurality of contiguous RBs and one or more consecutive symbols included in a CORESET, and (ii) a PDCCH occasion (e.g., a time-domain position at which a PDCCH is to be received), based on information (e.g., pdcch-ConfigSIB1) included in the MIB. In the absence of a Type0-PDCCH common search space, pdcch-ConfigSIB1 provides information about a frequency position at which the SSB/SIB1 exists and information about a frequency range without any SSB/SIB1.

SIB1 includes information related to availability and scheduling (e.g., a transmission periodicity and an SI-window size) of the remaining SIBs (hereinafter, referred to as SIBx where x is an integer equal to or larger than 2). For example, SIB1 may indicate whether SIBx is broadcast periodically or in an on-demand manner upon UE request. If SIBx is provided in the on-demand manner, SIB1 may include information required for the UE to transmit an SI request. A PDCCH that schedules SIB1 is transmitted in the Type0-PDCCH common search space, and SIB1 is transmitted on a PDSCH indicated by the PDCCH.

SIBx is included in an SI message and transmitted on a PDSCH. Each SI message is transmitted within a periodic time window (i.e., SI-window).

Beam Alignment

Figure 12:
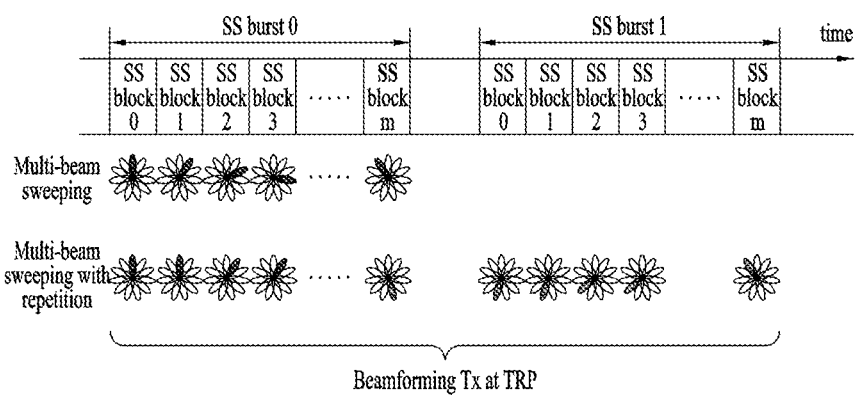

FIG. 12 illustrates exemplary multi-beam transmission of SSBs.

Beam sweeping refers to changing the beam (direction) of a wireless signal over time at a transmission reception point (TRP) (e.g., a BS/cell) (hereinafter, the terms beam and beam direction are interchangeably used). An SSB may be transmitted periodically by beam sweeping. In this case, SSB indexes are implicitly linked to SSB beams. An SSB beam may be changed on an SSB (index) basis or on an SS (index) group basis. In the latter, the same SSB beam is maintained in an SSB (index) group. That is, the transmission beam direction of an SSB is repeated for a plurality of successive SSBs. The maximum allowed transmission number L of an SSB in an SSB burst set is 4, 8 or 64 according to the frequency band of a carrier. Accordingly, the maximum number of SSB beams in the SSB burst set may be given according to the frequency band of a carrier as follows.

For frequency range of up to 3 GHz, maximum number of beams=4

For frequency range from 3 GHz to 6 GHz, maximum number of beams=8

For frequency range from 6 GHz to 52.6 GHz, maximum number of beams=64

Without multi-beam transmission, the number of SSB beams is 1.

When the UE attempts initial access to the BS, the UE may align beams with the BS based on an SSB. For example, the UE performs SSB detection and then identifies a best SSB. Subsequently, the UE may transmit an RACH preamble in PRACH resources linked/corresponding to the index (i.e., beam) of the best SSB. The SSB may also be used for beam alignment between the BS and the UE even after the initial access.

Channel Measurement and Rate Matching

Figure 13:
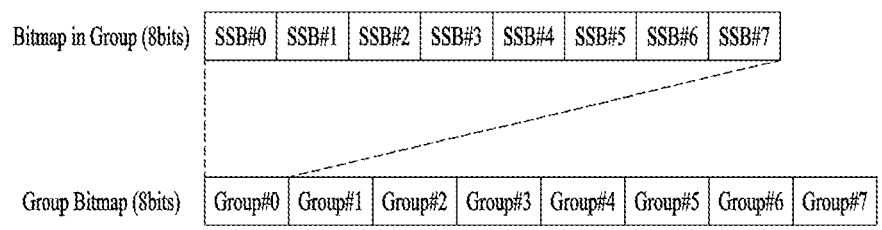

FIG. 13 illustrates an exemplary method of indicating actually transmitted SSBs, SSB_tx.

Up to L SSBs may be transmitted in an SSB burst set, and the number and positions of actually transmitted SSBs may be different for each BS or cell. The number and positions of actually transmitted SSBs are used for rate-matching and measurement, and information about actually transmitted SSBs is indicated as follows.

If the information is related to rate matching, the information may be indicated by UE-specific RRC signaling or RMSI. The UE-specific RRC signaling includes a full bitmap (e.g., of length L) for frequency ranges below and above 6 GHz. The RMSI includes a full bitmap for a frequency range below 6 GHz and a compressed bitmap for a frequency range above 6 GHz, as illustrated in FIG. 13. Specifically, the information about actually transmitted SSBs may be indicated by a group-bitmap (8 bits)+an in-group bitmap (8 bits). Resources (e.g., REs) indicated by the UE-specific RRC signaling or the RMSI may be reserved for SSB transmission, and a PDSCH and/or a PUSCH may be rate-matched in consideration of the SSB resources.

If the information is related to measurement, the network (e.g., BS) may indicate an SSB set to be measured within a measurement period, when the UE is in RRC connected mode. The SSB set may be indicated for each frequency layer. Without an indication of an SSB set, a default SSB set is used. The default SSB set includes all SSBs within the measurement period. An SSB set may be indicated by a full bitmap (e.g., of length L) in RRC signaling. When the UE is in RRC idle mode, the default SSB set is used.

Figure 14:
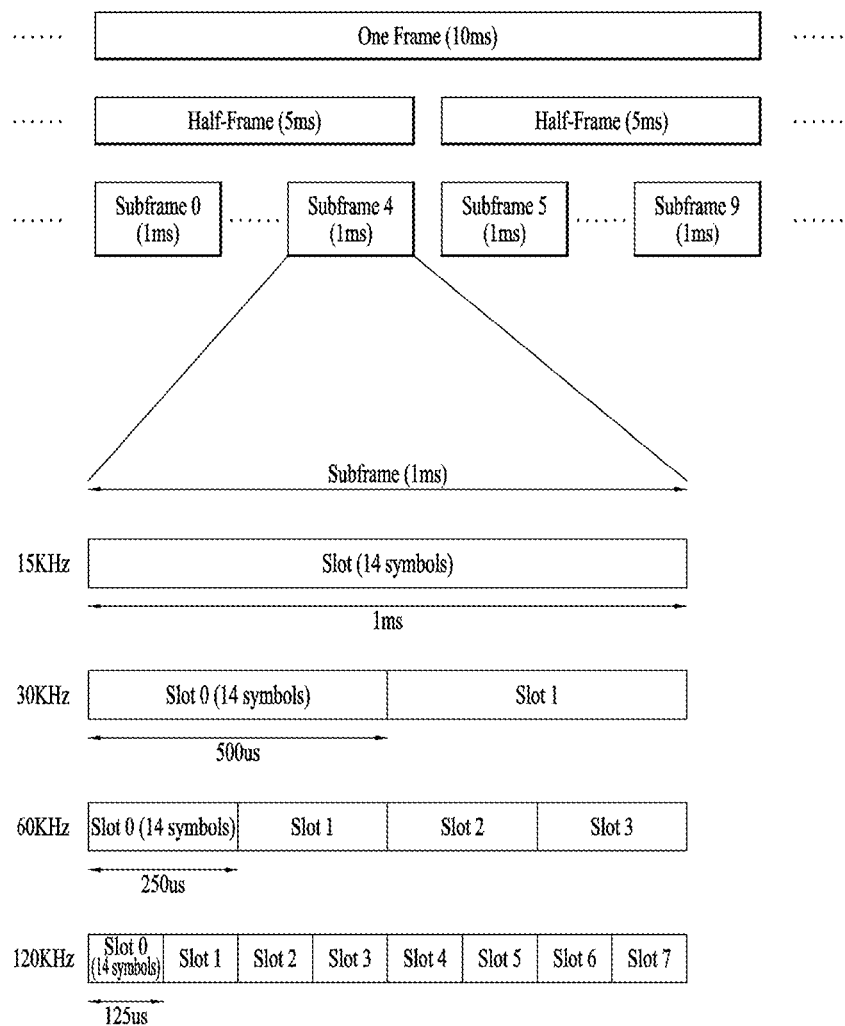
FIGS. 14 to 16 are diagrams illustrating a radio frame structure and a slot structure in the NR system.

FIG. 14 illustrates a radio frame structure in NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on an SCS. Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may be an OFDM symbol (or a CP-OFDM symbol) and an SC-FDMA symbol (or a discrete Fourier transform-spread-OFDM (DFT-s-OFDM) symbol).

Table 4 exemplarily illustrates that the number of symbols per slot, the number of slots per frame, and the number of slots per subframe vary according to SCSs when the normal CP is used.

TABLE 4

| SCS (15 * 2^u) | $N^{slot}_{symb}$ | $N^{frame,u}_{slot}$ | $N^{subframe,u}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

* $N^{slot}_{symb}$: Number of symbols in a slot
* $N^{frame,u}_{slot}$: Number of slots in a frame
* $N^{subframe,u}_{slot}$: Number of slots in a subframe Table 5 illustrates that the number of symbols per slot, the number of slots per frame, and the number of slots per subframe vary according to SCSs when the extended CP is used.

TABLE 5

| SCS (15 * 2^u) | $N^{slot}_{symb}$ | $N^{frame,u}_{slot}$ | $N^{subframe,u}_{slot}$ |
| --- | --- | --- | --- |
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for simplicity, referred to as a time unit (TU)) composed of the same number of symbols may be configured differently between the aggregated cells.

Figure 15:
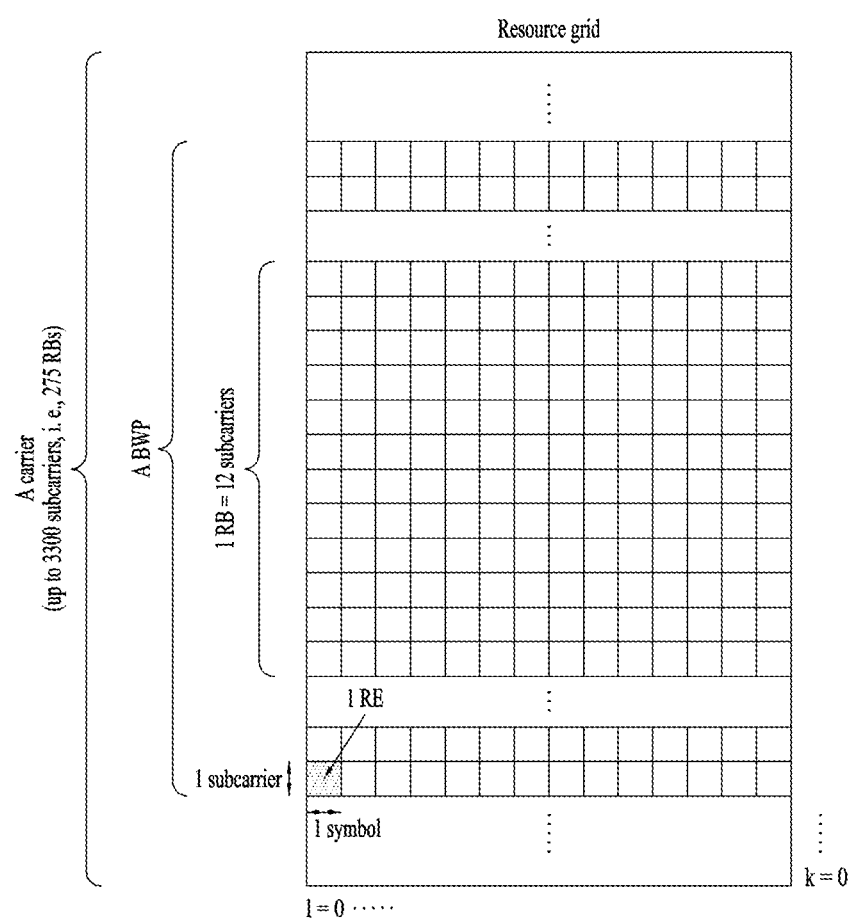

FIG. 15 illustrates a slot structure in an NR frame. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 4) BWPs. Data communication may be conducted in an active BWP, and only one BWP may be activated for one UE. Each element in a resource grid may be referred to as an RE, to which one complex symbol may be mapped.

Figure 16:
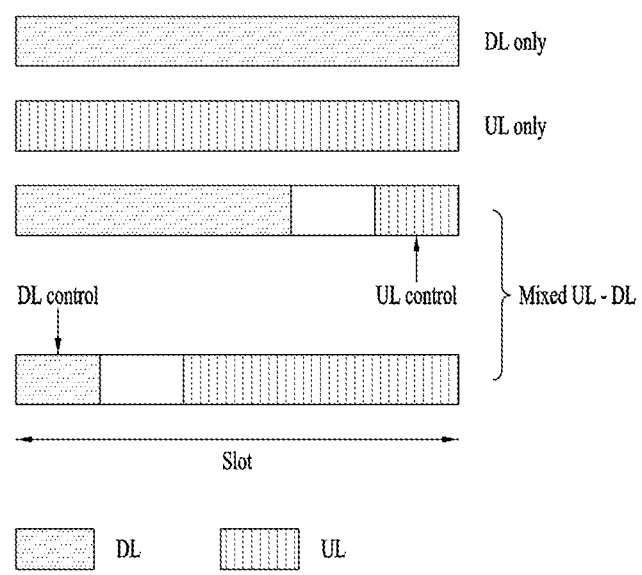

FIG. 16 illustrates the structure of a self-contained slot. In the NR system, a frame has a self-contained structure in which a DL control channel, DL or UL data, and a UL control channel may all be included in one slot. For example, the first N symbols (hereinafter, referred to as a DL control region) in a slot may be used to transmit a DL control channel, and the last M symbols (hereinafter, referred to as a UL control region) in the slot may be used to transmit a UL control channel. N and M are integers equal to or greater than 0. A resource region (hereinafter, referred to as a data region) between the DL control region and the UL control region may be used for DL data transmission or UL data transmission. For example, the following configurations may be considered. The periods are listed in time order.
1. DL only configuration
2. UL only configuration
3. Mixed UL-DL configuration
   DL region+guard period (GP)+UL control region
   DL control region+GP+UL region
      DL region: (i) DL data region or (ii) DL control region+DL data region
      UL region: (i) UL data region or (ii) UL data region+ UL control region A PDCCH may be transmitted in the DL control region, and a PDSCH may be transmitted in the DL data region. A PUCCH may be transmitted in the UL control region, and a PUSCH may be transmitted in the UL data region. The PDCCH may carry DCI, for example, DL data scheduling information and UL data scheduling information. The PUCCH may carry UCI, for example, ACK/NACK information for DL data, CSI, and a scheduling request (SR). The GP provides a time gap in the process of switching from the transmission mode to the reception mode or from the reception mode to the transmission mode at the BS and the UE. Some symbols at the time of switching from DL to UL in a subframe may be configured as the GP.

Bandwidth Part (BWP)

In the NR system, up to 400 MHz per carrier may be supported. When a UE operating in such a wideband carrier always operates with a radio frequency (RF) module for the entire carrier turned on, battery consumption of the UE may increase. Alternatively, considering various use cases (e.g., eMBB, URLLC, mMTC, and so on) operating within a single wideband carrier, a different numerology (e.g., SCS) may be supported for each frequency band within the carrier. Alternatively, each UE may have a different maximum bandwidth capability. In this regard, the BS may indicate to the UE to operate only in a partial bandwidth instead of the total bandwidth of the wideband carrier. The partial bandwidth may be defined as a BWP. A BWP is a subset of contiguous common RBs defined for numerology ui in BWP i on the carrier, and one numerology (e.g., SCS, CP length, or slot or mini-slot duration) may be configured for the BWP.

The BS may configure one or more BWPs in one carrier configured for the UE. Alternatively, when UEs are concentrated on a specific BWP, the BS may configure another BWP for some of the UEs, for load balancing. Alternatively, the BS may exclude some spectrum of the total bandwidth and configure both-side BWPs of the cell in the same slot in consideration of frequency-domain inter-cell interference cancellation between neighboring cells. That is, the BS may configure at least one DL/UL BWP for a UE associated with the wideband carrier, activate at least one of DL/UL BWP(s) configured at a specific time point (by L1 signaling being a physical-layer control signal, a MAC control element (CE) being a MAC-layer control signal, or RRC signaling), or set a timer value and switch the UE to a predetermined DL/UL BWP, upon expiration of the timer. To indicate switching to another configured DL/UL BWP, DCI format 1_1 or DCI format 0_1 may be used. The activated DL/UL BWP may be referred to as an active DL/UL BWP. During initial access or before an RRC connection setup, the UE may not receive a configuration for a DL/UL BWP from the BS. A DL/UL BWP that the UE assumes in this situation is defined as an initial active DL/UL BWP.

A DL BWP is a BWP in which a DL signal such as a PDCCH and/or a PDSCH is transmitted and received, whereas a UL BWP is a BWP in which a UL signal such as a PUCCH and/or a PUSCH is transmitted and received.

In the NR system, a DL channel and/or a DL signal may be transmitted and received in an active DL BWP. Further, a UL channel and/or a UL signal may be transmitted and received in an active UL BWP.

DL Channel Structures

A BS transmits related signals on later-described DL channels to a UE, and the UE receives the related signals on the DL channels from the BS.

(1) Physical Downlink Shared Channel (PDSCH)

The PDSCH delivers DL data (e.g., a DL-SCH TB) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

(2) Physical Downlink Control Channel (PDCCH)

The PDCCH delivers DCI and adopts QPSK as a modulation scheme. One PDCCH includes 1, 2, 4, 8, or 16 control channel elements (CCEs) according to its aggregation level (AL). One CCE includes 6 resource element groups (REGs), each REG being defined by one OFDM symbol by one (P)RB).

Figure 17:
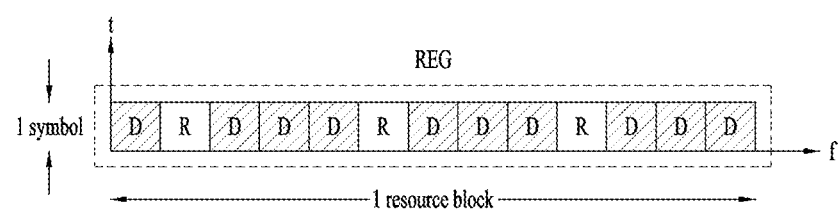
FIGS. 17 to 19 are diagrams illustrating a physical downlink control channel (PDCCH) in the NR system.

FIG. 17 illustrates an exemplary structure of one REG. In FIG. 17, D represents an RE to which DCI is mapped, and R represents an RE to which a DMRS is mapped. The DMRS is mapped to RE #1, RE #5, and RE #9 along the frequency direction in one symbol.

The PDCCH is transmitted in a CORESET. A CORESET is defined as a set of REGs with a given numerology (e.g., an SCS, a CP length, or the like). A plurality of CORESETs for one UE may overlap with each other in the time/ frequency domain. A CORESET may be configured by system information (e.g., an MIB) or UE-specific higher-layer signaling (e.g., RRC signaling). Specifically, the number of RBs and the number of symbols (3 at maximum) in the CORESET may be configured by higher-layer signaling.

For each CORESET, a precoder granularity in the frequency domain is set to one of the followings by higher-layer signaling:

sameAsREG-bundle: It equals to an REG bundle size in the frequency domain.

allContiguousRBs: It equals to the number of contiguous RBs in the frequency domain within the CORESET.

The REGs of the CORESET are numbered in a time-first mapping manner. That is, the REGs are sequentially numbered in an ascending order, starting from 0 for the first OFDM symbol of the lowest-numbered RB in the CORESET.

Figures 18A, 18B:
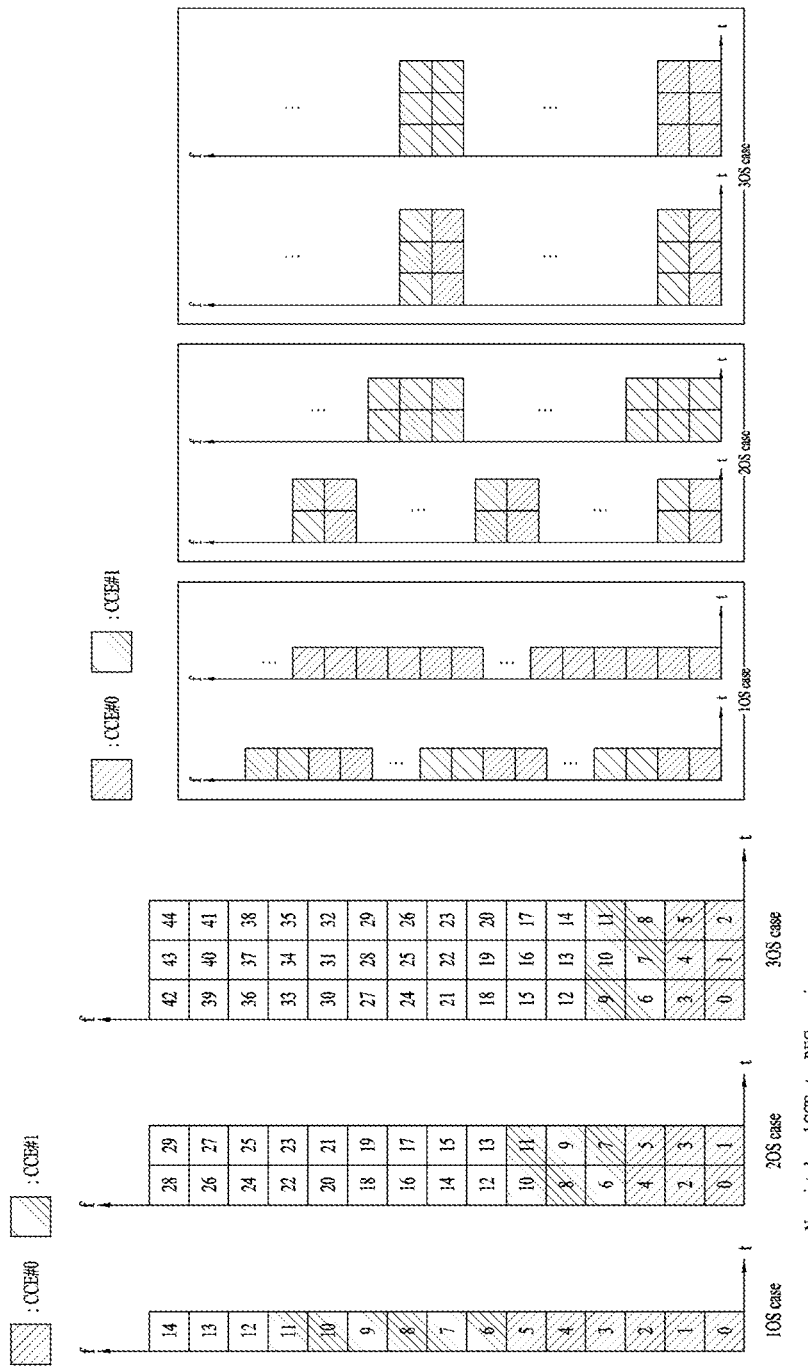

CCE-to-REG mapping for the CORESET may be an interleaved type or a non-interleaved type. FIG. 18A is a diagram illustrating non-interleaved CCE-REG mapping, and FIG. 18B is a diagram illustrating interleaved CCE-REG mapping.

Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 19:
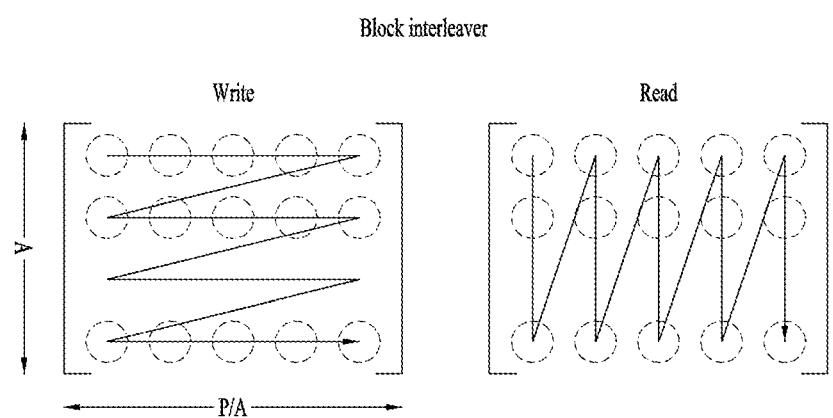

FIG. 19 illustrates an exemplary block interleaver. For the above interleaving operation, the number A of rows in a (block) interleaver is set to one or 2, 3, and 6. When the number of interleaving units for a given CORESET is P, the number of columns in the block interleaver is P/A. In the block interleaver, a write operation is performed in a row-first direction, and a read operation is performed in a column-first direction, as illustrated in FIG. 19. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space or a UE-specific search space. The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates (one of 0, 1, 2, 3, 4, 5, 6, and 8) for each AL={1, 2, 4, 8, 16}.

Table 6 lists features of the respective search space types.

TABLE 6

| Type | Search Space | RNTI | Use Case |
| --- | --- | --- | --- |
| Type0 - PDCCH | Common | SI-RNTI on a primary cell | SIB Decoding |
| Type0A - PDCCH | Common | SI-RNTI on a primary cell | SIB Decoding |
| Type1 - PDCCH | Common | RA-RNTI or TC-RNTI on a primary cell | Msg 2, Msg 4 decoding in RACH |
| Type2 - PDCCH | Common | P-RNTI on a primary cell | Paging Decoding |
| Type3 - PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 7 lists exemplary DCI formats transmitted on the PDCCH.

TABLE 7

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

Random Access (or RACH) Procedure

When a UE initially accesses a BS or has no radio resources for signal transmission, the UE may perform an RACH procedure to the BS.

The RACH procedure is used for various purposes. For example, the RACH procedure may be used for network initial access in RRC_IDLE, an RRC connection re-establishment procedure, handover, UE-triggered UL data transmission, transition from RRC_INACTIVE, time alignment establishment in adding an SCell, other system information (OSI) request, and beam failure recovery. The UE may acquire UL synchronization and UL transmission resources by the RACH procedure.

There are a contention-based RACH procedure and a contention-free RACH procedure. Contention-based RACH procedures include a 4-step RACH procedure and a 2-step RACH procedure.

4-Step RACH Procedure: Type-1 Random Access Procedure

Figure 20A:
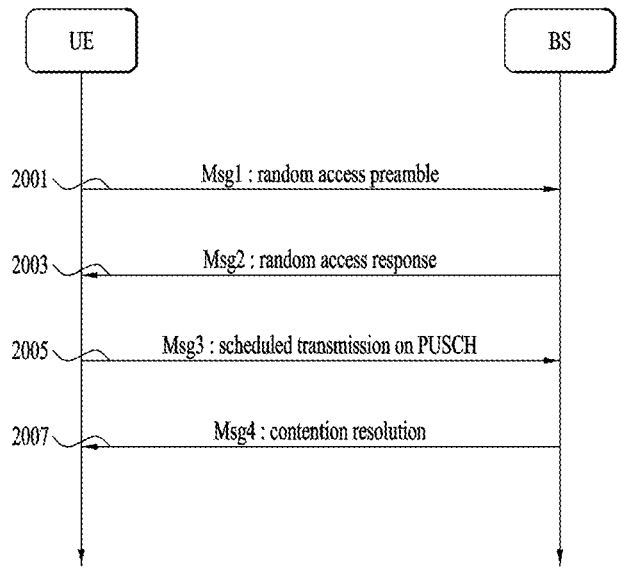
FIGS. 20A to 22 are diagrams illustrating exemplary random access procedures (or random access channel (RACH) procedures)
Figure 20B:
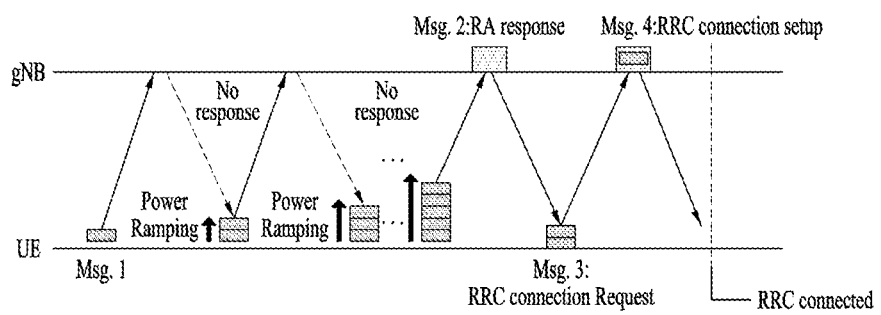

FIGS. 20A and 20B are diagrams illustrating an exemplary 4-step RACH procedure to which various embodiments of the present disclosure are applicable.

When a (contention-based) RACH procedure is performed in four steps (4-step RACH procedure), the UE may transmit a message (Message 1 (Msg 1)) including a preamble related to a specific sequence on a PRACH (2001) and receive a PDCCH and an RAR message (Message 2 (Msg 2)) on a PDSCH corresponding to the PDCCH in response to the preamble (2003). The UE may transmit a message (Message 3 (Msg 3)) including a PUSCH by using scheduling information included in the RAR (2005) and perform a contention resolution procedure such as reception of a PDCCH signal and a PDSCH signal corresponding to the PDCCH signal. The UE may receive a message (Message 4 (Msg 4)) including contention resolution information for the contention resolution procedure from the BS (2007).

The 4-step RACH procedure of the UE may be summarized in Table 8 below.

TABLE 8

| | Type of Signals | Operations/Information obtained |
|---|---|---|
| 1$^{st}$ step | PRACH preamble in UL | Initial beam acquisition Random election of RA-preamble ID |
| 2$^{nd}$ Step | Random Access Response on DL-SCH | Timing alignment information RA-preamble ID Initial UL grant, Temporary C-RNTI |
| 3$^{rd}$ Step | UL transmission on UL-SCH | RRC connection request UE identifier |
| 4$^{th}$ Step | Contention Resolution on DL | Temporary C-RNTI on PDCCH for initial access C-RNTI on PDCCH for UE in RRC_CONNECTED |

First, the UE may transmit an RACH preamble as Msg 1 on a PRACH in an RACH procedure.

Random access preamble sequences of two different lengths are supported. The length 839 of the longer sequence is applied to the SCSs of 1.25 kHz and 5 kHz, whereas the length 139 of the shorter sequence is applied to the SCSs of 15 kHz, 30 kHz, 60 kHz, and 120 kHz.

Multiple preamble formats are defined by one or more RACH OFDM symbols and different CPs (and/or guard times). An RACH configuration for a cell is provided in system information of the cell to the UE. The RACH configuration includes information about a PRACH SCS, available preambles, and a preamble format. The RACH configuration includes information about associations between SSBs and RACH (time-frequency) resources. The UE transmits an RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit an RACH preamble in RACH resources associated with the selected SSB.

Upon receipt of the RACH preamble from the UE, the BS transmits an RAR message (Msg 2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive an RAR on a PDSCH scheduled by DCI carried on the PDCCH. The UE determines whether the RAR includes RAR information for its transmitted preamble, that is, Msg 1. The UE may make the determination by checking the presence or absence of the RACH preamble ID of its transmitted preamble in the RAR. In the absence of the response to Msg 1, the UE may retransmit the RACH preamble a predetermined number of or fewer times, while performing power ramping. The UE calculates PRACH transmission power for a preamble retransmission based on the latest path loss and a power ramping counter.

The RAR information may include the preamble sequence transmitted by the UE, a cell RNTI (C-RNTI) that the BS has allocated to the UE attempting random access, UL transmit time alignment information, UL transmission power adjustment information, and UL radio resource allocation information. Upon receipt of its RAR information on the PDSCH, the UE may acquire time advance information for UL synchronization, an initial UL grant, and a temporary C-RNTI. The timing advance information is used to control a UL signal transmission timing. To align a PUSCH and/or PUCCH transmission of the UE with a subframe timing of a network end, the network (e.g., the BS) may measure the time difference between PUSCH, PUCCH, or SRS reception and a subframe and transmit the timing advance information based on the time difference. The UE may transmit a UL signal as Msg 3 of the RACH procedure on a UL-SCH based on the RAR information. Msg 3 may include an RRC connection request and a UE ID. The network may transmit Msg 4 in response to Msg 3. Msg 4 may be handled as a contention resolution message on DL. As the UE receives Msg 4, the UE may enter the RRC_CONNECTED state.

As described before, the UL grant included in the RAR schedules a PUSCH transmission for the UE. A PUSCH carrying an initial UL transmission based on the UL grant of the RAR is referred to as an Msg 3 PUSCH. The contents of the RAR UL grant start from the MSB and ends in the LSB, given as Table 6.

TABLE 9

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

The transmit power control (TPC) command is used to determine the transmission power of the Msg 3 PUSCH. For example, the TPC command is interpreted according to Table 7.

TABLE 10

| TPC command | value [dB] |
|---|---|
| 0 | −6 |
| 1 | −4 |

TABLE 10-continued

| TPC command | value [dB] |
|---|---|
| 2 | −2 |
| 3 | 0 |
| 4 | 2 |
| 5 | 4 |
| 6 | 6 |
| 7 | 8 |

2-Step RACH Procedure: Type-2 Random Access Procedure

Figure 21:
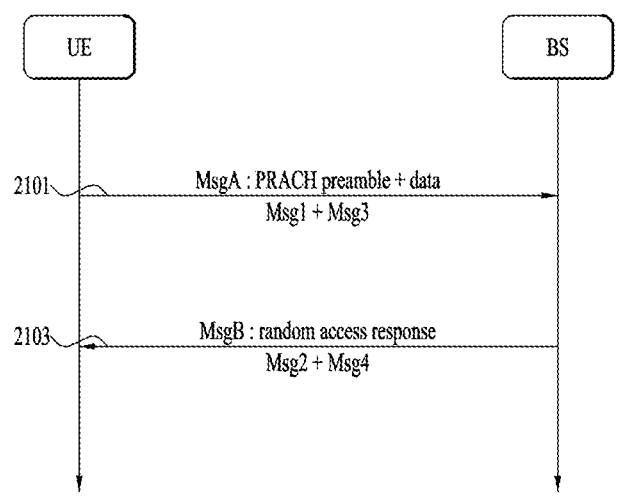

FIG. 21 is a diagram illustrating an exemplary 2-step RACH procedure to which various embodiments of the present disclosure are applicable.

A (contention-based) RACH procedure performed in two steps, that is, a 2-step RACH procedure has been proposed to simplify the RACH procedure and thus achieve low signaling overhead and low latency.

In the 2-step RACH procedure, the operation of transmitting Msg 1 and the operation of transmitting Msg 3 in the 4-step RACH procedure may be incorporated into an operation of transmitting one message, Message A (Msg A) including a PRACH and a PUSCH by the UE. The operation of transmitting Msg 2 by the BS and the operation of transmitting Msg 4 by the BS in the 4-step RACH procedure may be incorporated into an operation of transmitting one message, Message B (Msg B) including an RAR and contention resolution information.

That is, in the 2-step RACH procedure, the UE may combine Msg 1 and Msg 3 of the 4-step RACH procedure into one message (e.g., Msg A) and transmit the message to the BS (2101).

Further, in the 2-step RACH procedure, the BS may combine Msg 2 and Msg 4 of the 4-step RACH procedure into one message (e.g., Msg B) and transmit the message to the UE (2103).

The 2-step RACH procedure may become a low-latency RACH procedure based on the combinations of these messages.

More specifically, Msg A may include a PRACH preamble included in Msg 1 and data included in Msg 3 in the 2-step RACH procedure. In the 2-step RACH procedure, Msg B may include an RAR included in Msg 2 and contention resolution information included in Msg 4.

Contention-Free RACH Procedure

Figure 22:
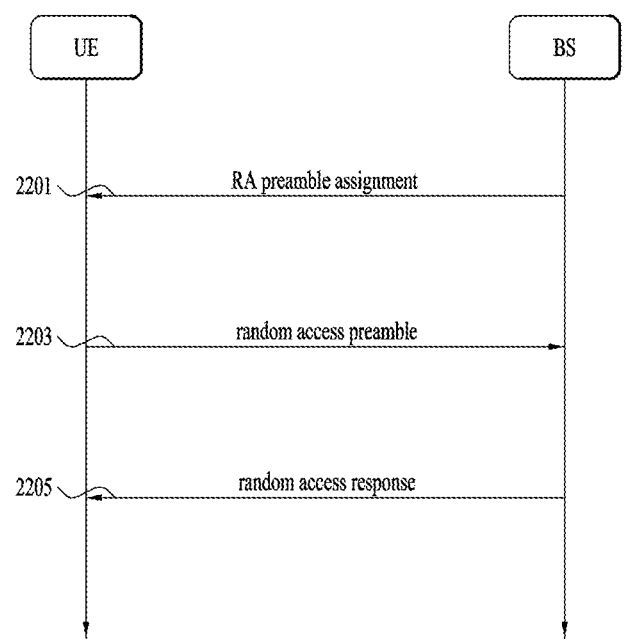

FIG. 22 is a diagram illustrating an exemplary contention-free RACH procedure to which various embodiments of the present disclosure are applicable.

The contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure (2201). Information about the dedicated RACH preamble may be included in an RRC message (e.g., a handover command) or provided to the UE by a PDCCH order. When the RACH procedure starts, the UE transmits the dedicated RACH preamble to the BS (2203). When the UE receives an RAR from the BS, the RACH procedure is completed (2205).

In the contention-free RACH procedure, a CSI request field in an RAR UL grant indicates whether the UE is to include an aperiodic CSI report in a corresponding PUSCH transmission. An SCS for Msg 3 PUSCH transmission is provided by an RRC parameter. The UE may transmit the PRACH and the Msg 3 PUSCH on the same UL carrier of the same serving cell. A UL BWP for the Msg 3 PUSCH transmission is indicated by SIB1.

Before a detailed description, implementation examples of operations of a UE and a BS according to an embodiment of the present disclosure will be described below with reference to FIGS. 23 and 24.

Figure 23:
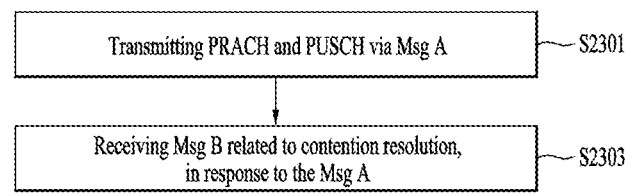
FIGS. 23 and 24 are flowcharts illustrating specific implementation examples of operations of a user equipment (UE) and a base station (BS) according to an embodiment of the present disclosure.

FIG. 23 is a diagram illustrating an implementation example of an operation of a UE according to the present disclosure. Referring to FIG. 23, the UE may transmit a PRACH and PUSCH in Msg A (S2301). The UE may then receive Msg B related to contention resolution in response to Msg A (S2303). A specific method of performing an RACH procedure by the UE in steps S2301 and S2303 may be based on the later-described embodiments and features.

The UE illustrated in FIG. 23 may be one of various wireless devices illustrated in FIGS. 26 to 29. For example, the UE of FIG. 23 may be a first wireless device 100 illustrated in FIG. 26 or a wireless device 100 or 200 illustrated in FIG. 27. In other words, the operation of FIG. 23 may be performed by one of the various wireless devices illustrated in FIGS. 26 to 29.

Figure 24:
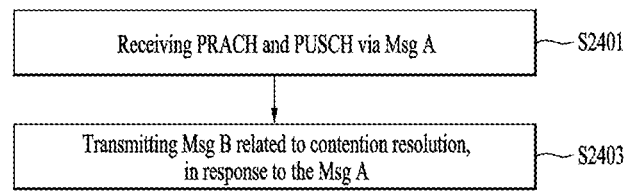

FIG. 24 is a diagram illustrating an implementation example of an operation of a BS according to the present disclosure. Referring to FIG. 24, the BS may receive a PRACH and PUSCH in Msg A (S2401). The BS may then transmit Msg B related to contention resolution in response to Msg A (S2403). A specific method of performing an RACH procedure by the BS in steps S2401 and S2403 may be based on the later-described embodiments and features.

The BS illustrated in FIG. 24 may be one of various wireless devices illustrated in FIGS. 26 to 29. For example, the BS of FIG. 24 may be a second wireless device 200 illustrated in FIG. 26 or the wireless device 100 or 200 illustrated in FIG. 27. In other words, the operation of FIG. 24 may be performed by one of the various wireless devices illustrated in FIGS. 26 to 29.

In the LTE and/or NR system, a UE may perform a UL transmission by an RACH procedure without being scheduled for the UL transmission directly by a given BS or cell. From the perspective of the UE, the RACH procedure in the LTE and/or NR system is a 4-step procedure including 1) random access preamble transmission, 2) reception of Msg 2 corresponding to an RAR, 3) transmission of Msg 3 including a PUSCH, and 4) reception of Msg 4 including contention resolution information.

Msg 2 is a message by which the BS allocates UL resources to be used for transmission of Msg 3 from the UE which has transmitted a preamble, upon receipt of the preamble. The UE may transmit its identification information such as an IMSI or a TMSI and information about a connection request by Msg 3. Upon receipt of Msg 3, the BS transmits the identification information of the UE and information required for random access in Msg 4, thereby preventing collision between different UEs during the RACH procedure and completing the RACH procedure for the UE.

Compared to legacy LTE and NR Rel-15 in which the RACH procedure is performed in four steps as described above, the 2-step RACH procedure is under study to reduce the processing delay of the 4-step RACH procedure and use the RACH procedure even in a small cell or an unlicensed bandwidth in the newly introduced NR Rel-6. The 2-step RACH procedure does not include the step of transmitting Msg 3 and the step of transmitting Msg 4 including a contention resolution message. Instead, the UE transmits both a message corresponding to Msg 3 and a preamble as Msg A to the BS in the first step of the RACH procedure, and the BS transmits both a message corresponding to Msg 4 and an RAR as Msg B in response to Msg A to the UE. Upon receipt of Msg B, the UE completes the RACH procedure by decoding Msg B and then performs data transmission and reception.

Before embodiments of the present disclosure are described, resources used for transmission of Msg A including a preamble and a PUSCH, that is, an RACH occasion (RO) and a PUSCH occasion (PO) will be described in brief.

The UE transmits a preamble in an RO associated with a beam satisfying an RSRP threshold among candidate beams transmitted to the BS. For example, when a plurality of beams have RSRPs exceeding a pre-indicated RSRP threshold among indicated candidate beams, the UE selects a beam having the largest RSRP or randomly selects a beam from among the plurality of beams and transmits the preamble in an RO associated with the selected beam.

An Msg A PUSCH and an Msg A PRACH may be transmitted successively with or without a predetermined gap between them in the time domain. Alternatively, the Msg A PUSCH and the Msg A PRACH may be transmitted simultaneously in FDM. A PO carrying the Msg A PUSCH may be associated with the RO carrying the preamble. For example, POs may be mapped to a plurality of ROs configured for the UE in a one-to-one or one-to-multi correspondence. In another example, total preambles allocated to the ROs may be divided into a plurality of sub-groups and POs may be mapped to the sub-groups by applying a predetermined time or frequency offset to each sub-group. The number of sub-groups may vary according to a situation or may be fixed. The number of sub-groups may be used in one-to-one mapping between sub-grouped preambles and POs in a table. A time offset may be understood as an offset in symbols, slots, or subframes from the last symbol of an RO, indicating the starting time of a PO. The position of the PO indicated by the offset may be set in available UL resources after the offset among resources indicated by DL/UL configurations. Further, a frequency offset may indicate the starting point of the PO on the frequency axis from a subcarrier with the lowest or highest index among subcarriers or RBs of the RO.

In the present disclosure, when a UE transmits a preamble and a PUSCH in Msg A based on an RO and a PO configured in the above manner, setting of initial transmission power and retransmission power for a PUSCH according to a beam direction used for preamble transmission and a beam direction used for PUSCH transmission will be described below.

Setting of Ramping Step Size and Counter for Msg A PRACH/PUSCH

When the transmission power of the Msg A PRACH and the transmission power of the Msg PUSCH in the 2-step RACH procedure are addressed, it may be necessary to discuss setting of factors such as a ramping step size and a counter, for power ramping.

(1) Setting and Indication of Ramping Step Size for Msg A PRACH

1) Regarding a ramping step size for power control of the Msg A PRACH, use of more time/frequency resources and more power consumption in (re)transmission of the Msg A PRACH than in (re)transmission of the legacy message, Msg 1 may be considered. If Msg 1 and the Msg A PRACH use the same ramping step size and the same preamble received target power (PRTP) and are transmitted in the same RO, there may be little difference between the detection possibility of the Msg A PRACH and the detection possibility of Msg 1 in view of the accompanying Msg A PUSCH in spite of use of more time/frequency resources and more power consumption for the Msg A PRACH. In this case, when the BS fails to successfully detect the Msg A PRACH, the power consumption of the UE and an overall time taken for the RACH procedure may increase.

Accordingly, it may be appropriate to set a ramping step size for power control of the Msg A PRACH independently of that of Msg 1. This method may prevent unnecessary power consumption and a procedure delay, and take advantage of the 2-step RACH procedure.

2) When a ramping step size for power control of the Msg A PRACH is set independently of that of Msg 1 in the 2-step RACH procedure, the ramping step size for power control of the Msg A PRACH may be indicated in many ways.

First, the introduction of a new parameter indicating the ramping step size of the Msg A PRACH may be considered. This new parameter may directly indicate a ramping step size use for transmission of the Msg A PRACH or may indicate a related offset which is applicable to a ramping step size used for transmission of Msg 1 and thus is used to indicate the ramping step size of the Msg A PRACH.

Alternatively, an existing parameter used in the legacy 4-step RACH procedure may be used to indicate the ramping step size of the Msg A PRACH. A powerRampingStepHighPriority parameter indicating a ramping step size used to support a high-priority RACH procedure is used for a power control configuration in the legacy 4-step RACH procedure. In the case where both the 2-step RACH procedure and the 4-step RACH procedure are available, the 2-step RACH procedure may be determined to have priority over the 4-step RACH procedure because Msg A imposes a heavier burden on resource use and power consumption than Msg 1. Therefore, the ramping step size of Msg A may be indicated by means of the powerRampingStepHighPriority parameter according to the method.

(2) Setting of Ramping Step Size and Counter for Msg PUSCH

Considering that the Msg A PRACH and the Msg A PUSCH are transmitted sequentially before feedback of the BS in the 2-step RACH procedure, a parameter used for the transmission power of the Msg A PRACH may be used and applied as a power setting parameter for transmission of the Msg A PUSCH. Particularly, it should be determined whether the same ramping counter or ramping step size may be used for both the Msg A PRACH and the Msg A PUSCH in relation to power setting factors. From this perspective, the transmission power of the Msg A PUSCH may be set in the following methods.

1) The same ramp-up based on the same counter for the Msg A PRACH and the Msg A PUSCH In this case, power $\Delta_{rampuprequested}$ required for transmission of the Msg A PUSCH may be given by (PREAMBLE_POWER_RAMPING_COUNTER−1)× [MsgA]powerRampingStep based on power parameters used for transmission of the Msg A PRACH. As noted, the same power parameters may be used for the transmissions of the Msg A PRACH and the Msg A PUSCH. It may further be determined whether the same ramping counter as used for the transmission of Msg 1 in the legacy 4-step RACH procedure is to be used for the transmission of the Msg A PRACH in the 2-step RACH procedure.

2) Individual Ramp-Up Based on Different Counters for Msg A PRACH and Msg A PUSCH In this case, power $\Delta_{rampuprequested}$ required for transmission of the Msg A PUSCH may be given by (MSGAPUS- CH_POWER_RAMPING_COUNTER−1)×PUSCHpower-RampingStep, based on additional parameters used for the transmission of the Msg A PUSCH. As noted, different power parameters may be used for the transmissions of the Msg A PRACH and the Msg PUSCH.

3) Individual Ramp-Up Based on the Same Counter for Msg A PRACH and Msg A PUSCH

In this case, power $\Delta_{rampuprequested}$ required for transmission of the Msg A PUSCH may be given by (PREAMBLE_POWER_RAMPING_COUNTER−1)×PUSCHpowerRampingStep, based on parameters used for the transmission of the Msg A PRACH and additional parameters used for the transmission of the Msg A PUSCH. As noted, the ramping counter as a power parameter is indicated by a parameter related to the transmission of the Msg A PRACH, and the ramping step size as a power parameter is indicated by a parameter related to the transmission of the Msg A PUSCH.

As described before, there is a need for considering individual application of a power ramping counter and a power ramping step size, for control of the transmission power of the Msg A PUSCH. For example, the maximum allowed transmission number of an Msg 1 preamble is limited to a value indicated by the preambleTransMax parameter. Likewise, if the Msg A PRACH and the Msg A PUSCH are based on a single maximum allowed transmission number for Msg A and transmitted continuously, it is not necessary to use separate ramping counters for the Msg A PRACH and the Msg PUSCH. In contrast, if only one of the Msg A PRACH and the Msg PUSCH is transmitted or a maximum allowed transmission number is set for each of the Msg A PRACH and the Msg PUSCH in a certain situation, individual ramping counters may be needed for the Msg A PRACH and the Msg PUSCH. That is, when the Msg A PRACH and the Msg PUSCH are handled as one bundle, a single ramping counter may be used.

For ramping step sizes, it should be considered that the detection and collision possibilities of the Msg A PRACH and the Msg PUSCH may not always be equal because their channel and transmission environments are different in spite of continuous transmission of the Msg A PRACH and the Msg PUSCH. For example, if a plurality of UEs transmit PRACH preambles simultaneously in one RO, with separate/independent allocation of PUSCH resources for each PRACH preamble, the BS may have different detection and collision possibilities for the PRACH preambles. Because the detection and collision possibility of Msg A varies under circumstances, setting the ramping step size of the Msg A PUSCH restrictively to that of the Msg A PRACH may result in unnecessary ramping power consumption of the Msg A PUSCH and decreased freedom in power control of the Msg A PUSCH. Moreover, when the BS fails to detect the preceding Msg A PRACH irrespective of whether decoding of the Msg A PUSCH is successful, power ramping of the following Msg A PUSCH may lead to unnecessary power consumption, and as the ramping step size is larger, the power consumption is also increased. Therefore, it may be inefficient to set the transmission power of the Msg A PUSCH by applying the ramping step size of the Msg A PRACH to the Msg A PUSCH. Accordingly, it may be more appropriate to set the ramping step size of the Msg A PUSCH independently of the ramping step size of the Msg A PRACH than to set the ramping step size of the Msg A PUSCH to be equal to the ramping step size of the Msg A PRACH.

From the above perspective, it may be concluded that the third method of setting the power of the Msg A PUSCH by using the same counter and individual ramp-up sizes for the Msg A PRACH and the Msg A PUSCH may be most appropriate.

Transmission (Tx) Spatial Filter (Beam) Selection

The issue of beam selection or Tx spatial filter selection for the Msg A PRACH and the Msg A PUSCH may also be addressed. Particularly, a beam or spatial filter for the Msg A PUSCH may be configured to be identical to or different from a beam or spatial filter for the Msg A PRACH according to whether the UE is capable of channel estimation before transmitting the Msg A PUSCH, and power may be set differently according to the direction of a beam or spatial filter for each signal. For example, when different Tx beams or spatial filters are used for transmissions of the Msg A PRACH and the Msg A PUSCH, different ramping counters may be set for the Msg A PRACH and the Msg A PUSCH, for individual power control of the Msg A PRACH and the Msg A PUSCH.

The Msg A PUSCH may be transmitted in TDM after the Msg A PRACH or in FDM simultaneously with the Msg A PRACH. For the convenience of description, beam or spatial filter-based power setting is described below in the context of the Msg A PRACH and the Msg A PUSCH being transmitted in TDM, which should not be construed as limiting.

If there is a time gap of a predetermined duration between the transmission of the Msg A PRACH and the transmission of the Msg A PUSCH, the UE may perform channel estimation by using an SSB or a CSI-RS received from the BS before the transmission of the Msg A PUSCH. In this situation, the UE may select a different best Tx beam or spatial filter according to the estimated channel environment. That is, the UE may transmit the Msg A PUSCH by selecting a different Tx beam or spatial filter for the transmission of the Msg A PUSCH from that of the Msg A PRACH, depending on implementation. The BS basically expects to decode the PUSCH in PUSCH resources assumed based on the random access preamble index (RAPID) of the received Msg A PRACH and an SSB index related to the RAPID. Hereinbelow, a description will be given of a method of selecting beams or spatial filters for the Msg A PRACH and the Msg A PUSCH and setting power based on the selected beams or spatial filters in a different manner depending on whether the UE is capable of channel estimation during a time period between transmission of the Msg A PRACH and transmission of the Msg A PUSCH.

(1) When the UE is not capable of channel estimation during a time period between the Msg A PRACH and the Msg A PUSCH, the following operation is performed.

If the UE is not capable of channel estimation during the time period between the Msg A PRACH and the Msg A PUSCH, this implies that the Msg A PRACH and the Msg A PUSCH are transmitted continuously without a gap in between or the gap between the transmission time points of the two signals is too small for the UE to receive an SSB or a CSI-RS required for channel estimation, and thus it is impossible for the UE to perform channel estimation. Therefore, the UE may transmit the Msg A PUSCH by using a best beam or spatial filter set for the Msg A PRACH, without separately selecting a beam or spatial filter for the Msg A PUSCH. The transmission power of the Msg A PUSCH may then be determined by the following equation.

$$P_{PUSCH}(i) = \max(P_{CMAX}, [MsgA]\text{preambleReceivedTargetPower} + \Delta_{MsgA\_PUSCH} + 10 \log_{10}(2^{\mu} M_{RB}^{PUSCH}(i)) + \alpha PL(i) + \Delta_{TF}(i) + \Delta_{rampup}(i))$$

where preambleReceivedTargetPower is a preamble-related factor indicating the PRTP of a preamble, and $\Delta_{MsgA\_PUSCH}$ represents an additional power offset required for the transmission of the Msg A PUSCH. Further, power consumed per RB may be set to 10 $\log_{10}(2^\mu M_{RB}^{PUSCH}(i))$, and $\Delta_{TF}(i)$ represents a power gain based on on/off of a modulation and coding scheme (MCS). $\alpha PL(i)$ is a path loss index, and $\Delta_{rampup}(i)$ is a power ramping size set for retransmission.

Among the factors used in the above equation, the PRTP may be set to the PRTP of Msg 1 in the 4-step RACH procedure, may be set separately for the Msg A PRACH, or may be set to a combination of the PRTP of Msg 1 and a separately configured offset. Further, because the UE is not capable of channel estimation during the time period between the Msg A PRACH and the Msg A PUSCH, a value used for the path loss index may be obtained based on RSRP calculated from an SSB or CSI-RS used for channel estimation of a previous Msg A PRACH transmission. In this case, the path loss index of the Msg A PUSCH transmission in the 2-step RACH procedure is eventually based on the index of an RS resource indicated for the transmission of the Msg A PRACH and thus reflected in power setting.

(2) When the UE is capable of channel estimation during a time period between the Msg A PRACH and the Msg A PUSCH, the following operation is performed.

When the UE is capable of channel estimation during the time period between the Msg A PRACH and the Msg A PUSCH, this may imply that the UE is capable of receiving an SSB or a CSI-RS from the BS during the time period between the transmission time points of the Msg A PRACH and the Msg A PUSCH. That is, during the time period between the transmission time points of the Msg A PRACH and the Msg A PUSCH, the UE may receive the SSB at least one more time or if the UE is a connected UE, the UE may additionally obtain RSRP per a beam or a spatial filter by receiving the CSI-RS, and determine a beam or a spatial filter to be used for the transmission of the Msg A PUSCH based on these procedures.

The best Tx beam or spatial filter that the UE has used for the transmission of the Msg A PRACH may not be best for the transmission of the Msg A PUSCH after a certain time for such a reason as change of a best Tx-Rx beam pair due to a time delay. Among the factors used in the aforedescribed equation for determining the transmission power of the Msg A PUSCH, the path loss index $\alpha PL(i)$ may be re-calculated by using a channel estimate obtained from the SSB or the CSI-RS during the time period between the transmission of the Msg A PRACH and the transmission of the Msg A PUSCH, and used for the equation.

That is, $\alpha PL(i)$ is calculated based on the channel estimation performed before the transmission of the Msg A PRACH in the case of impossible channel estimation during the time period between the transmission time points of the Msg A PRACH and the Msg PUSCH, whereas $\alpha PL(i)$ is calculated based on channel estimation performed between the transmission of the Msg A PRACH and the transmission of Msg A PUSCH in the case of possible channel estimation during the time period between the transmission time points of the Msg A PRACH and the Msg PUSCH. The UE may select a best Tx beam or spatial filter by using the calculated $\alpha PL(i)$ and assign power accordingly. Thus, the UE may transmit the Msg A PUSCH in the direction of the selected beam or spatial filter.

Further, the indexes of a group of SSBs used for channel estimation during the time period between the transmissions of the Msg A PRACH and the Msg A PUSCH would be equal to the indexes of a group of SSBs used for channel estimation of the Msg A PRACH transmitted before the Msg A PUSCH, and the time/frequency resources for the transmission of the Msg A PUSCH would also be associated with the indexes of the group of SSBs. That is, for the transmission of the Msg A PUSCH in the 2-step RACH procedure, the UE calculates a path loss index by using the same index as that of an RS resource indicated for the transmission of the Msg A PRACH corresponding to the Msg A PUSCH, and reflects the path loss index in power setting.

Figure 25:
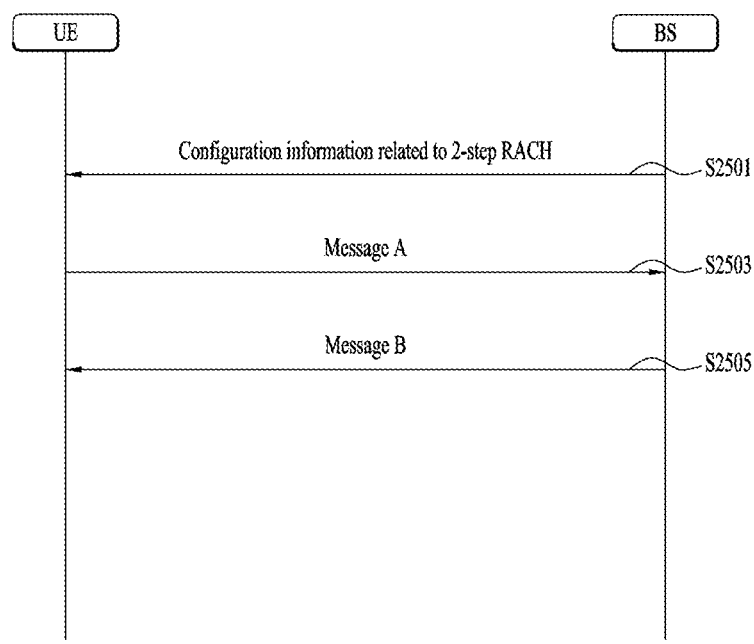
FIG. 25 is a diagram illustrating a signal flow for operations of a UE and a BS for performing a 2-step RACH procedure according to embodiments of the present disclosure.

FIG. 25 is a diagram illustrating a signal flow for operations of a UE and a BS for performing the 2-step RACH procedure according to embodiments of the present disclosure. The UE and the BS transmit and receive RACH configuration information to perform the 2-step RACH procedure. The RACH configuration information may include information related to the embodiments of the present disclosure such as a power ramping step size and/or a ramping counter for setting transmission power, and a transmission beam or a spatial filter (S2501). Specifically, the BS may transmit the RACH configuration information by an SSB and/or RRC signaling, such as an MIB and an SIB.

Step S2501 may not be performed for a UE which has established a connection with the BS, such as a UE which has already received the RACH configuration information or a UE re-accessing the BS which has transmitted the RACH configuration information to the UE. Because Such a UE has already acquired the RACH configuration information, step S2501 may be omitted to reduce a processing delay caused by redundant transmission and reception of the RACH configuration information.

Figure 26:
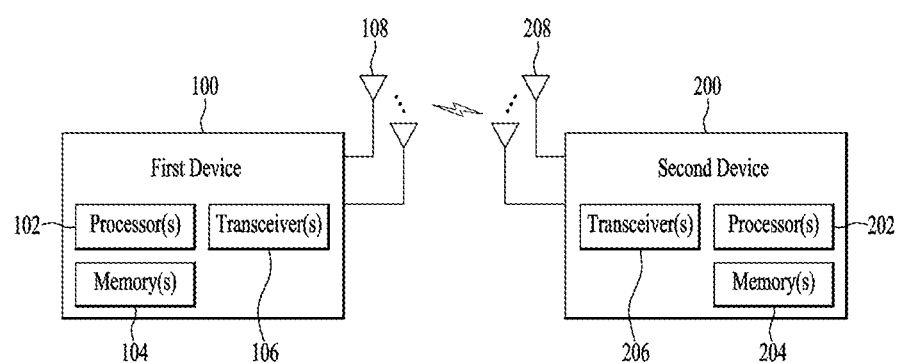
FIGS. 26 to 29 are diagrams illustrating various exemplary wireless devices to which embodiments of the present disclosure are applied.
Figure 27:
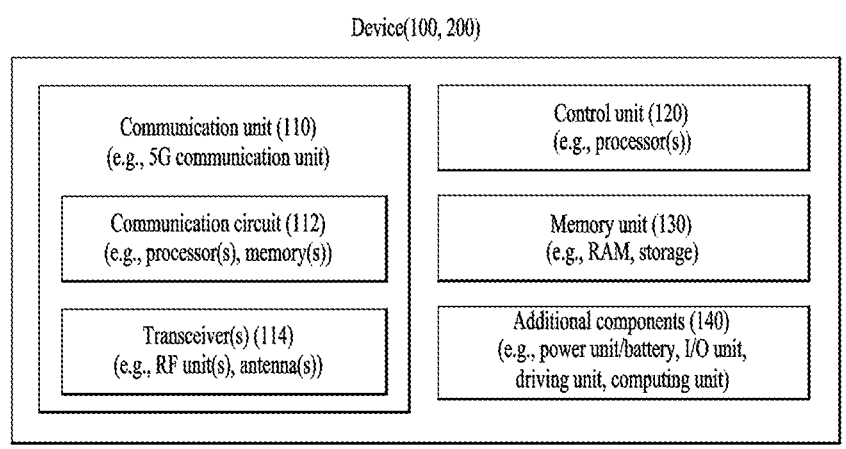

In step S2501, the UE may be the wireless device 100 of FIG. 26 or the wireless device 100 or 200 of FIG. 27, and the BS may be the second wireless device 200 of FIG. 26 or the wireless device 100 or 200 of FIG. 27. That is, step S2501 in which the UE receives the RACH configuration information may be performed by various wireless devices illustrated in FIGS. 26 to 29 as described later. For example, when the UE is the wireless device 100 of FIG. 26, a processor 102 of FIG. 26 may control one or more transceivers 106 and/or one or more memories 104 to receive the RACH configuration information, and the one or more transceivers 106 may receive the RACH configuration information from the BS.

Subsequently, the UE may acquire contents of Msg A based on the received RACH configuration, select an RO/preamble and a PO/PUSCH resource unit (PRU) based on the acquired information, and transmit Msg A to the BS to perform the 2-step RACH procedure (S2503). The UE may transmit Msg A based on a configuration related to embodiments of the present disclosure, such as a ramping step size and/or a counter for setting transmission power, and a transmission beam or a spatial filter.

In step S2503, the UE may be the wireless device 100 of FIG. 26 or the wireless device 100 or 200 of FIG. 27, and the BS may be the second wireless device 200 of FIG. 26 or the wireless device 100 or 200 of FIG. 27. That is, step S2503 in which the UE transmits Msg A to the BS may be performed by various wireless devices illustrated in FIGS. 26 to 29 as described later. For example, when the UE is the wireless device 100 of FIG. 26, the processor 102 of FIG. 26 may control the one or more transceivers 106 and/or the one or more memories 104 to transmit Msg A, and the one or more transceivers 106 may transmit Msg A to the BS.

In an example of the transmission of Msg A in step S2503, an RO for the 2-step RACH procedure may be allocated in consideration of an RO allocated for the 4-step RACH procedure as follows. i) ROs and preambles may be configured independently for the 2-step RACH procedure and the 4-step RACH procedure, ii) the same RO may be shared between the 2-step RACH procedure and the 4-step RACH procedure, with preambles separately configured for the RACH procedures, or iii) the same RO and the same preamble may be shared between the 2-step RACH procedure and the 4-step RACH procedure.

In another example of the transmission of Msg A in step S2503, a PRU for transmission of the Msg A PUSCH may be defined in consideration of a PO, a DMRS port, and a DMRS sequence. A PO may be defined as time-frequency resources for payload transmission. A PO for the Msg A PUSCH may be configured independently of the RO, or configured as a relative time and/or frequency position in consideration of the associated RO. One or more POs may be configured within a configured period of the Msg A PUSCH.

In another example of the transmission of Msg A in step S2503, the PRACH and the PUSCH included in Msg A may be transmitted in different slots in TDM or in the same slot. In other words, the Msg A PUSCH and the Msg A PRACH may be transmitted successively in the time domain with or without a predetermined gap.

In another example of the transmission of Msg A in step S2503, the PRACH and the PUSCH included in Msg A may be transmitted by using i) the same beam or the same Tx spatial filter, ii) the same or different beams or spatial filters according to determination of the UE, or iii) a beam or spatial filter configured by the BS.

In another example of the transmission of Msg A in step S2503, the UE may configure an RAR window to monitor Msg B after transmitting Msg A. To record the number of reattempts of the 2-step RACH procedure, the UE may set a retransmission counter for Msg A. A maximum counter value may be configured by the BS or the network.

In another example of the transmission of Msg A in step S2503, the BS may detect the preamble of the Msg A PRACH and decode the payload/data of the Msg A PUSCH. When the BS fails to detect the preamble of the Msg A PRACH, the BS may transmit no information to the UE.

As described above, embodiments of the present disclosure may be applied appropriately in step S2503 for transmitting Msg A to the BS by the UE. Specifically, in the foregoing methods according to the embodiments of the present disclosure, a value of or information about a ramping step size and/or a ramping counter for the preamble and the PUSCH included in Msg A may be determined by the UE or the BS or configured for or indicated to the UE by the BS. Alternatively, the transmission power based on a beam configuration for the preamble and the PUSCH included in Msg A may be determined by the UE or the BS or configured for or indicated to the UE by the BS.

After transmitting Msg A, the UE may receive Msg B (S2505). Msg B may be scheduled by a PDCCH corresponding to a DMRS and transmitted on a PDSCH corresponding to the DMRS. The contents of Msg B may vary according to the result of decoding and processing the Msg A PUSCH.

Specifically, when the BS succeeds in decoding the Msg A PUSCH, Msg B may include a contention resolution ID such as a UE ID transmitted in a common control channel (CCCH) service data unit (SDU) that the UE transmits as a success RAR. When the BS fails in decoding the Msg A PUSCH, Msg B may include, as a fallback RAR, a radon access preamble ID (RAPID) and a UL grant for retransmission of the Msg A PUSCH. When the BS transmits the fallback RAR in Msg B and the UE succeeds in decoding the RAPID and the UL grant included in Msg B, the UE may fall back to the 4-step RACH procedure.

In step S2505, the UE may be the wireless device 100 of FIG. 26 or the wireless device 100 or 200 of FIG. 27, and the BS may be the second wireless device 200 of FIG. 26 or the wireless device 100 or 200 of FIG. 27. That is, step S2505 in which the UE receives Msg B from the BS may be performed by various wireless devices illustrated in FIGS. 26 to 29 as described later. For example, when the UE is the wireless device 100 of FIG. 26, the processor 102 of FIG. 26 may control the one or more transceivers 106 and/or the one or more memories 104 to receive Msg B, and the one or more transceivers 106 may receive Msg B from the BS.

Depending on whether the UE decodes and receives Msg B, the UE may operate in the same manner as or a similar manner to the operations subsequent to reception of Msg 4 in the 4-step RACH procedure. When the UE successfully receives Msg B within an RAR window, the UE may determine that the 2-step RACH procedure is successful. Alternatively, when the UE receives the fallback RAR, the UE may perform the Msg 3 transmission procedure of the 4-step RACH procedure based on the information included in Msg B, like a UL grant.

On the contrary, when the UE fails to receive Msg B within the RAR window and the retransmission counter value is less than a maximum allowed value, the UE may retransmit Msg A to reattempt the 2-step RACH procedure. When the retransmission counter value reaches the maximum allowed value, the UE may perform a back-off operation, determining that the 2-step RACH procedure is failed. A retransmission of Msg A may mean a retransmission of the Msg A PRACH including preamble reselection and a retransmission of the Msg A PUSCH. When a different transmission beam or spatial filter from that of the latest transmitted Msg A PRACH is used for the retransmission of the Msg A PRACH, the power ramping counter value for the Msg A PRACH may not be incremented.

The embodiments related to the above-described 2-step RACH procedure of the present disclosure may be applied even in the RRC_INACTIVE, RRC_CONNECTED, and RRC_IDLE states, and may be implemented as a general MAC procedure. Exceptionally, the embodiments related to the above-described 2-step RACH procedure of the present disclosure may not be applied to an SI request/beam failure recovery (BFR) procedure. Further, it may be configured that the legacy 4-step RACH procedure is re-performed in consideration of fall-back in the 2-step RACH procedure.

The various descriptions, functions, procedures, proposals, methods, and/or operational flowcharts of the present disclosure described in this document may be applied to, without being limited to, a variety of fields requiring wireless communication/connection (e.g., 5G) between devices.

A detailed description will be given of examples below with reference to the drawings. In the following drawings/description, the same reference symbols may denote the same or corresponding hardware blocks, software blocks, or functional blocks, unless specified otherwise.

FIG. 26 illustrates wireless devices applicable to the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 2.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including commands for performing all or a part of processes controlled by the processor(s) 102 or for performing the descriptions, functions, procedures, proposals, methods, and/or operational flowcharts disclosed in this document. Herein, the processor(s) 102 and the memory(s) 104 may be part of a communication modem/circuit/chip designed to implement RAT (e.g., LTE or NR). The transceiver(s) 106 may be connected to the processor(s) 102 and transmit and/or receive radio signals through the one or more antennas 108. Each of the transceiver(s) 106 may include a transmitter and/or a receiver. The transceiver(s) 106 may be interchangeably used with RF unit(s). In the present disclosure, a wireless device may refer to a communication modem/circuit/chip.

The processor 102 may control a transceiver 106 to transmit a PRACH and a PUSCH in Msg A. The processor 102 may control the transceiver 106 to receive Msg B related to contention resolution. A specific method of controlling the transceiver 106 to transmit Msg A and receive Msg B by the processor 102 may be based on the foregoing embodiments.

Specifically, commands stored in a memory 204 and/or operations, which are controlled by a processor 202 of the second wireless device 200 according to an embodiment of the present disclosure will be described below.

While the following operations are described in the context of control operations of the processor 202 from the perspective of the processor 202, software code for performing these operations may be stored in the memory 204.

A processor 202 may control a transceiver 206 to receive a PRACH and a PUSCH in Msg A. The processor 202 may control the transceiver 206 to transmit Msg B related to contention resolution. A specific method of controlling the transceiver 106 to receive Msg A and transmit Msg B by the processor 202 may be based on the foregoing embodiments.

Hardware elements of the wireless devices 100 and 200 will be described in more detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive signals (e.g., baseband signals) from the one or more transceivers 106 and 206 and acquire PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, instructions, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit, to one or more other devices, user data, control information, and/or radio signals/channels mentioned in the methods and/or operational flowcharts of this document. The one or more transceivers 106 and 206 may receive, from one or more other devices, user data, control information, and/or radio signals/channels mentioned in the descriptions, functions, procedures, proposals, methods, and/or operational flowcharts disclosed in this document. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be connected to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels from RF band signals into baseband signals in order to process received user data, control information, and radio signals/channels using the one or more processors 102 and 202. The one or more transceivers 106 and 206 may convert the user data, control information, and radio signals/channels processed using the one or more processors 102 and 202 from the base band signals into the RF band signals. To this end, the one or more transceivers 106 and 206 may include (analog) oscillators and/or filters.

FIG. 27 illustrates another exemplary a wireless device applied to the present disclosure. The wireless device may be implemented in various forms according to a use case/service (refer to FIG. 26).

Referring to FIG. 27, wireless devices 100 and 200 may correspond to the wireless devices 100 and 200 of FIG. 26 and may be configured with various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) through the communication unit 110 via a wireless/wired interface or store, in the memory unit 130, information received from the outside (e.g., other communication devices) through the communication unit 110 via the wireless/wired interface. Therefore, a specific operation of the control unit 120 and programs/code/commands/information stored in the memory unit 130 according to the present disclosure may corresponding to at least one operation of the processors 102 and 202 and at least one operation of the memories 104 and 204 illustrated in FIG. 26.

The additional components 140 may be configured in various ways according to the type of wireless device. For example, the additional components 140 may include at least one of a power unit/battery, input/output (I/O) unit, a driving unit, or a computing unit. The wireless device may be implemented in the form of, but not limited to, the robot (100*a* of FIG. 2), the vehicles (100*b*-1 and 100*b*-2 of FIG. 2), the XR device (100*c* of FIG. 2), the hand-held device (100*d* of FIG. 2), the home appliance (100*e* of FIG. 2), the IoT device (100*f* of FIG. 2), a digital broadcasting terminal, a hologram device, a public safety device, an MTC device, a medical device, a FinTech device (or a financial machine), a security device, a climate/environment device, the AI server/device (400 of FIG. 2), a BS (200 of FIG. 2), a network node, or the like. The wireless device may be used in a mobile or fixed place according to a use case/service.

In FIG. 27, all of the various elements, components, units/portions, and/or modules in the wireless devices 100 and 200 may be inter-connected through a wired interface or at least a part thereof may be wirelessly inter-connected through the communication unit 110. For example, in each of the wireless devices 100 and 200, the control unit 120 and the communication unit 110 may be connected wiredly, and the control unit 120 and first units (e.g., 130 and 140) may be connected wirelessly through the communication unit 110. Each element, component, unit/portion, and/or module in the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a RAM, a DRAM, a ROM, a flash memory, a volatile memory, a non-volatile memory, and/or a combination thereof.

Now, a detailed description will be given of an implementation example of the devices illustrated in FIG. 27 with reference to the drawings.

Figure 28:
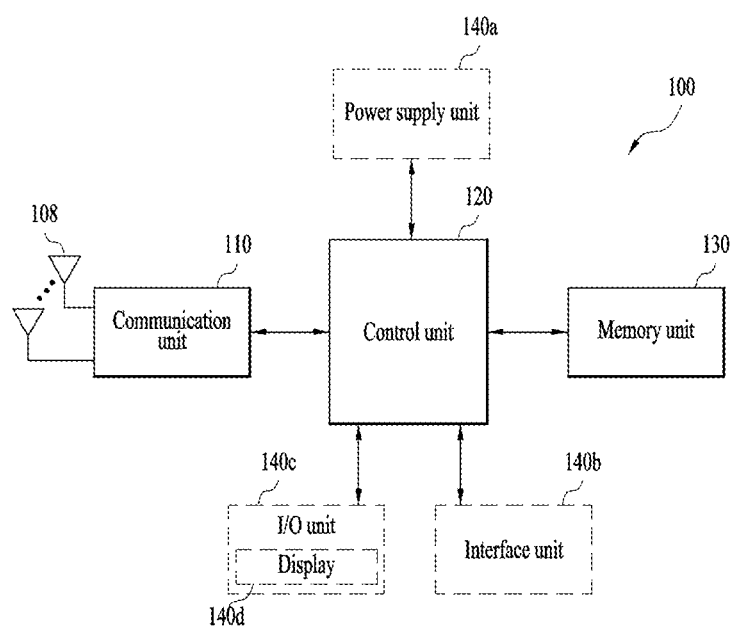

FIG. 28 illustrates a hand-held device applied to the present disclosure. The hand-held device may include a smartphone, a smart pad, a wearable device (e.g., a smart watch or smart glasses), or a portable computer (e.g., a laptop). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 28, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 27, respectively.

The communication unit 110 may transmit and receive signals (e.g., data and control signals) to and from other wireless devices or BSs. The control unit 120 may perform various operations by controlling components of the hand-held device 100. The control unit 120 may include an application processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, and so on. The interface unit 140*b* may support connection between the hand-held device 100 and other external devices. The interface unit 140*b* may include various ports (e.g., an audio I/O port and a video I/O port) for connection to external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

For example, in the case of data communication, the I/O unit 140c may acquire information/signals (e.g., touch, text, voice, images, or video) input by the user and the acquired information/signals may be stored in the memory unit 130. The communication unit 110 may convert the information/signals stored in the memory into radio signals and transmit the radio signals to other wireless devices directly or to a BS. The communication unit 110 may receive radio signals from other wireless devices or the BS and then restore the received radio signals to original information/signals. The restored information/signals may be stored in the memory unit 130 and output as various types (e.g., text, voice, images, video, or haptic) through the I/O unit 140c.

Figure 29:
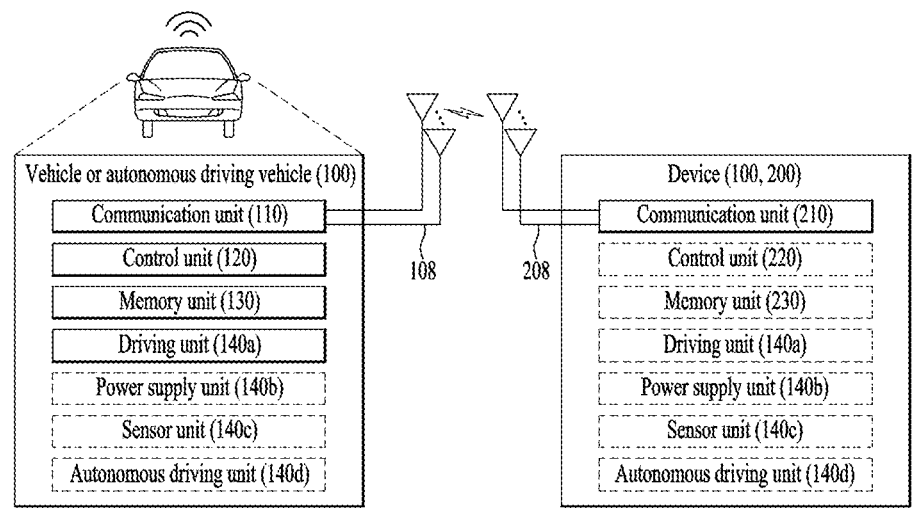

FIG. 29 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 29, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 27, respectively.

The communication unit 110 may transmit and receive signals (e.g., data and control signals) to and from external devices such as other vehicles, BSs (e.g., gNBs and road side units), and servers. The control unit 120 may perform various operations by controlling components of the vehicle or the autonomous driving vehicle 100. The control unit 120 may include an ECU. The driving unit 140a may cause the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information a vehicle state, ambient environment information, user information, and so on. The sensor unit 140c may include an inertial measurement unit (IMU) sensor, a collision sensor, a wheel sensor, a speed sensor, an inclination sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, and so on from an external server. The autonomous driving unit 140d may generate an autonomous driving path and a driving plan based on the obtained data. The control unit 120 may control the driving unit 140a to drive the vehicle or the autonomous driving vehicle 100 along the autonomous driving path according to the driving plan (e.g., speed/direction control). In the middle of autonomous driving, the communication unit 110 may aperiodically or periodically acquire the latest traffic information data from the external server and acquire surrounding traffic information data from neighboring vehicles. In the middle of autonomous driving, the sensor unit 140c may obtain information about a vehicle state and/or surrounding environment information. The autonomous driving unit 140d may update the autonomous driving path and the driving plan based on the newly obtained data/information. The communication unit 110 may transfer information about a vehicle position, the autonomous driving path, and the driving plan to the external server. The external server may predict traffic information data using AI technology based on the information collected from vehicles or autonomous driving vehicles, and provide the predicted traffic information data to the vehicles or the autonomous driving vehicles.

Figure 30:
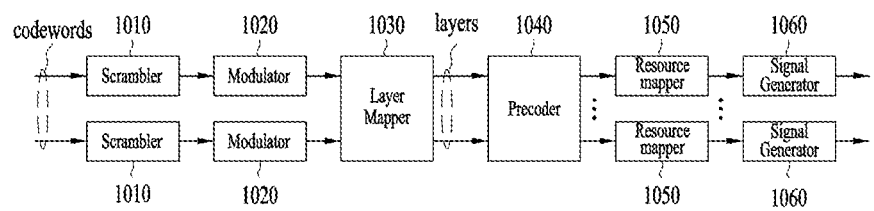
FIG. 30 is a diagram illustrating an exemplary signal processing circuit to which embodiments of the present disclosure are applied.

FIG. 30 illustrates a signal processing circuit for a transmission signal.

Referring to FIG. 30, a signal processing circuit 1000 may include scramblers 1010, modulators 1020, a layer mapper 1030, a precoder 1040, resource mappers 1050, and signal generators 1060. An operation/function of FIG. 30 may be performed by, but not limited to, the processors 102 and 202 and/or the transceivers 106 and 206 of FIG. 26. Hardware elements of FIG. 30 may be implemented by the processors 102 and 202 and/or the transceivers 106 and 206 of FIG. 26. For example, the blocks 1010 to 1060 may be implemented by the processors 102 and 202 of FIG. 26. Alternatively, the blocks 1010 to 1050 may be implemented by the processors 102 and 202 of FIG. 26 and the block 1060 may be implemented by the transceivers 106 and 206 of FIG. 26.

Codewords may be converted into radio signals through the signal processing circuit 1000 of FIG. 30. The codewords are coded bit sequences of information blocks. The information blocks may include TBs (e.g., UL-SCH TBs or DL-SCH TBs). The radio signals may be transmitted on various physical channels (e.g., a PUSCH or a PDSCH).

Specifically, the codewords may be converted into scrambled bit sequences by the scramblers 1010. Scramble sequences used for scrambling may be generated based on an initialization value, and the initialization value may include ID information about a wireless device. The scrambled bit sequences may be modulated to modulation symbol sequences by the modulators 1020. A modulation scheme may include pi/2-binary phase shift keying (pi/2-BPSK), m-phase shift keying (m-PSK), and m-quadrature amplitude modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. N is the number of antenna ports, and M is the number of transport layers. The precoder 1040 may perform precoding after transform precoding (e.g., DFT) for complex modulation symbols. Alternatively, the precoder 1040 may perform precoding without transform precoding.

The resource mappers 1050 may map modulation symbols of each antenna port to time-frequency resources. The time-frequency resources may include a plurality of symbols (e.g., CP-OFDMA symbols or DFT-s-OFDMA symbols) in the time domain and a plurality of subcarriers in the frequency domain. The signal generators 1060 may generate radio signals from the mapped modulation symbols, and the generated radio signals may be transmitted to other devices through each antenna. For this purpose, the signal generators 1060 may include inverse fast Fourier transform (IFFT) modules, CP inserters, digital-to-analog converters (DACs), and frequency upconverters.

Signal processing procedures for a signal received in the wireless device may be configured reversely to the signal processing procedures 1010 to 1060 of FIG. 30. For example, the wireless devices (e.g., 100 and 200 of FIG. 26) may receive radio signals from the outside through the antenna ports/transceivers. The received radio signals may be converted into baseband signals through signal restorers. To this end, the signal restorers may include frequency downconverters, analog-to-digital converters (ADCs), CP remover, and FFT modules. Subsequently, the baseband signals may be restored to codewords by resource demapping, postcoding, demodulation, and descrambling. The codewords may be decoded to original information blocks. Therefore, the signal processing circuit (not shown) for a received signal may include signal restorers, resource demappers, a postcoder, demodulators, descramblers, and decoders.

As is apparent from the foregoing description, according to the present disclosure, a UE may appropriately allocate transmission power to a signal for performing a 2-step RACH procedure in a wireless communication system.

While the method and apparatus for performing an RACH procedure by a UE in a wireless communication system have been described above in the context of a 5G NewRAT system, the method and apparatus are also applicable to various wireless communication systems other than the 5G NewRAT system.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, gNode B (gNB), Node B, enhanced Node B (eNode B or eNB), access point, and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A method of performing a 2-step random access channel (RACH) procedure by a user equipment (UE) in a wireless communication system, the method comprising:

transmitting, to a base station (BS), a preamble on a physical random access channel (PRACH) and a payload on a physical uplink shared channel (PUSCH) via a message A of the 2-step RACH procedure; and receiving, from the BS, a message B related to contention resolution after transmitting the message A, wherein an index related to a reference signal used for transmission power allocation to the PUSCH is same as an index of a resource used for channel measurement for transmission of the PRACH, based on that the PRACH and the PUSCH are transmitted via the message A, wherein a transmission power of the PUSCH is determined based on a preamble received target power, and an offset related to the preamble received target power, wherein the PRACH transmitted via the message A and the PUSCH transmitted via the message A are transmitted based on a predetermined time gap in a time domain, wherein a transmission beam for transmission of the PUSCH is selected based on a path loss for the transmission power allocation, wherein the path loss is calculated based on channel estimation performed between the transmission of the PRACH and the transmission of the PUSCH, and wherein the index related to the reference signal is used for calculating the path loss.

2. The method according to claim 1, further comprising receiving, from the BS, a synchronization signal block (SSB) or a channel state information-reference signal (CSI-RS), related to channel measurement for transmission of the PUSCH.

3. The method according to claim 2, wherein the channel measurement for the transmission of the PUSCH is performed based on reference signal received power (RSRP) of the SSB or the CSI-RS.

4. The method according to claim 2, wherein the index related to the reference signal is an index of the SSB related to the channel measurement for the transmission of the PUSCH.

5. An apparatus for performing a 2-step random access channel (RACH) procedure in a wireless communication system, the apparatus comprising:

at least one processor; and at least one memory operatively connected to the at least one processor and storing instructions which, when executed, cause the at least one processor to perform a specific operation, wherein the specific operation comprises:

transmitting, to a base station (BS) a preamble on a physical random access channel (PRACH) and a payload on a physical uplink shared channel (PUSCH) via a message A of the 2-step RACH procedure; and receiving a message B related to contention resolution after transmitting the message A, and wherein an index related to a reference signal used for transmission power allocation to the PUSCH is same as an index of a resource used for channel measurement for transmission of the PRACH, based on that the PRACH and the PUSCH are transmitted via the message A, wherein a transmission power of the PUSCH is determined based on a preamble received target power, and an offset related to the preamble received target power, wherein the PRACH transmitted via the message A and the PUSCH transmitted via the message A are transmitted based on a predetermined time gap in a time domain, wherein a transmission beam for transmission of the PUSCH is selected based on a path loss for the transmission power allocation, wherein the path loss is calculated based on channel estimation performed between the transmission of the PRACH and the transmission of the PUSCH, and wherein the index related to the reference signal is used for calculating the path loss.

6. The apparatus according to claim 5, wherein the specific operation further comprises receiving a synchronization signal block (SSB) or a channel state information-reference signal (CSI-RS), related to channel measurement for transmission of the PUSCH.

7. The apparatus according to claim 6, wherein the channel measurement for the transmission of the PUSCH is performed based on reference signal received power (RSRP) of the SSB or the CSI-RS.

8. The apparatus according to claim 6, wherein the index related to the reference signal is an index of the SSB related to the channel measurement for the transmission of the PUSCH.

9. A user equipment (UE) for performing a 2-step random access channel (RACH) procedure in a wireless communication system, the UE comprising:
 at least one transceiver;
 at least one processor; and
 at least one memory operatively connected to the at least one processor and storing instructions which, when executed, cause the at least one processor to perform a specific operation,
wherein the specific operation comprises:
transmitting, to a base station (BS), a preamble on a physical random access channel (PRACH) and a payload on a physical uplink shared channel (PUSCH) via a message A of the 2-step RACH procedure; and
receiving, from the BS, a message B related to contention resolution after transmitting the message A, and
wherein an index related to a reference signal used for transmission power allocation to the PUSCH is same as an index of a resource used for channel measurement for transmission of the PRACH, based on that the PRACH and the PUSCH are transmitted via the message A,
wherein a transmission power of the PUSCH is determined based on a preamble received target power, and an offset related to the preamble received target power,
wherein the PRACH transmitted via the message A and the PUSCH transmitted via the message A are transmitted based on a predetermined time gap in a time domain,
wherein a transmission beam for transmission of the PUSCH is selected based on a path loss for the transmission power allocation,
wherein the path loss is calculated based on channel estimation performed between the transmission of the PRACH and the transmission of the PUSCH, and
wherein the index related to the reference signal is used for calculating the path loss.

\* \* \* \* \*